US 8,249,810 B2

(12) United States Patent
Jones

(10) Patent No.: US 8,249,810 B2
(45) Date of Patent: Aug. 21, 2012

(54) METHOD OF AND APPARATUS FOR GENERATING ROUTES

(75) Inventor: Alan Henry Jones, Cambridge (GB)

(73) Assignee: Cotares Limited, Cambridgeshire (GB)

( * ) Notice: Subject to any disclaimer, the term of this patent is extended or adjusted under 35 U.S.C. 154(b) by 597 days.

(21) Appl. No.: 12/445,238

(22) PCT Filed: Sep. 18, 2007

(86) PCT No.: PCT/GB2007/050558
§ 371 (c)(1),
(2), (4) Date: Jun. 12, 2009

(87) PCT Pub. No.: WO2008/053240
PCT Pub. Date: May 8, 2008

(65) Prior Publication Data
US 2010/0036606 A1    Feb. 11, 2010

(30) Foreign Application Priority Data

Oct. 30, 2006   (GB) .................................. 0621508.1

(51) Int. Cl.
*G01C 21/34* (2006.01)
(52) U.S. Cl. ........................................ 701/533; 701/400
(58) Field of Classification Search .................. 701/400, 701/409–412, 428, 430–431, 500, 533
See application file for complete search history.

(56) References Cited

U.S. PATENT DOCUMENTS

| 5,938,720 A * | 8/1999 | Tamai ........................... 701/209 |
| 6,377,551 B1 | 4/2002 | Luo et al. |
| 6,401,234 B1 | 6/2002 | Alpert et al. |
| 2004/0039520 A1 | 2/2004 | Khavakh et al. |

FOREIGN PATENT DOCUMENTS

EP    1335315    8/2003

OTHER PUBLICATIONS

UK Search Report for Application No. GB0621508.1, dated Jul. 3, 2007.
International Search Report for Application No. PCT/GB2007/050558, dated Dec. 3, 2007.

* cited by examiner

*Primary Examiner* — Yonel Beaulieu
(74) *Attorney, Agent, or Firm* — Patterson & Sheridan, LLP

(57) ABSTRACT

A method is provided of generating a plurality of diverse routes from a source to a destination in a weighted directed graph. Such a method may be used for route planning or navigation with the weighted directed graph representing a road network, but may also be used in other applications. A source routing tree is generated from the source to a first set of points of the graph, which may comprise some or all of the points. A destination routing tree is generated from some or all of the points of the graph to the destination. The trees are then combined to form the routes. For example, the sub-routes common to and transverses in the same direction by the source and destination trees may be selected. The sub routes may then be formed into the routes by extending each sub-route as necessary to the source and destination along the source and destination trees.

46 Claims, 15 Drawing Sheets

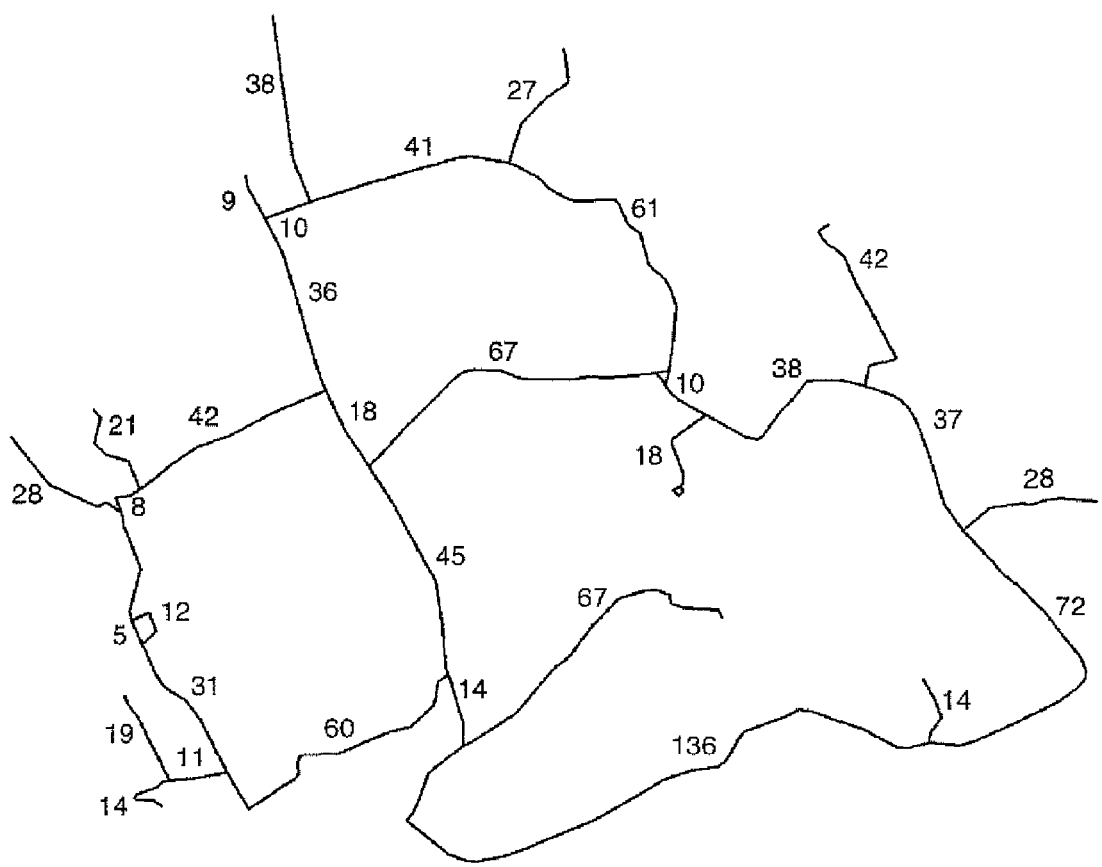
Figure 1. Distances

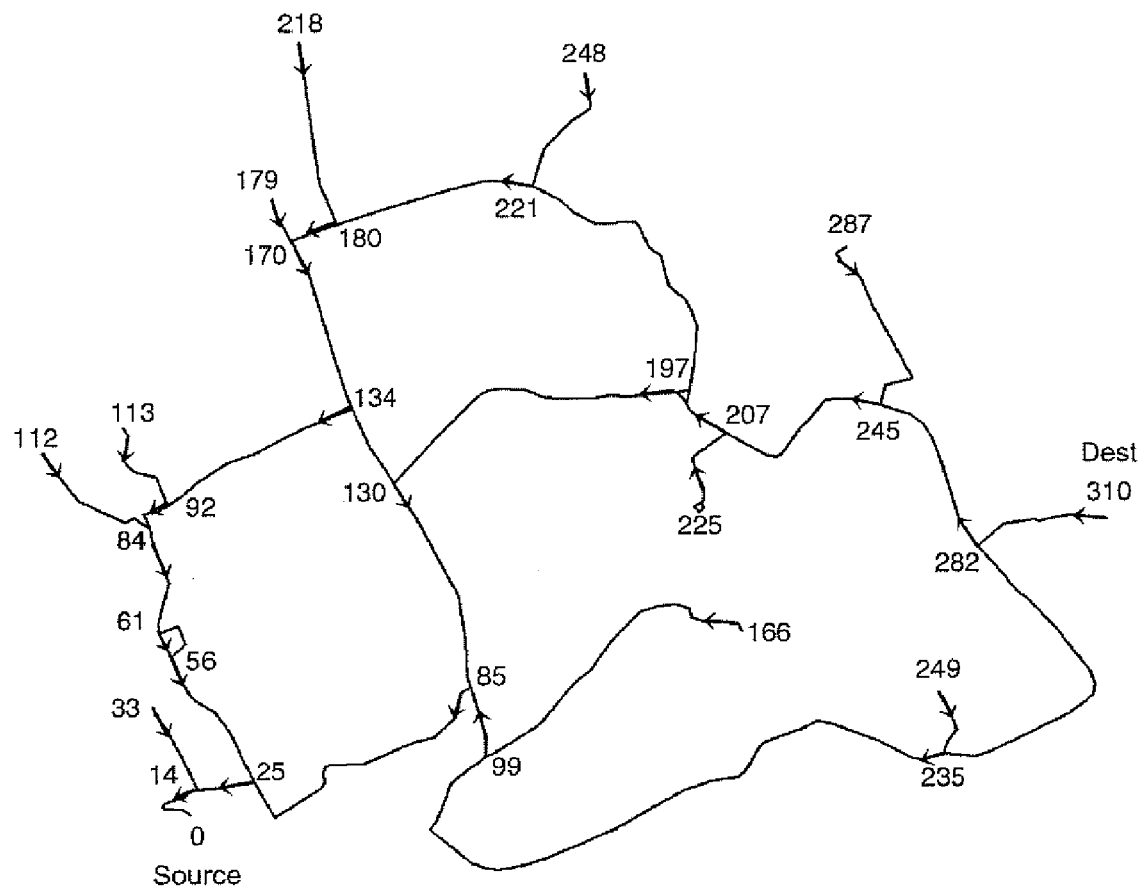
Figure 2. Source Tree

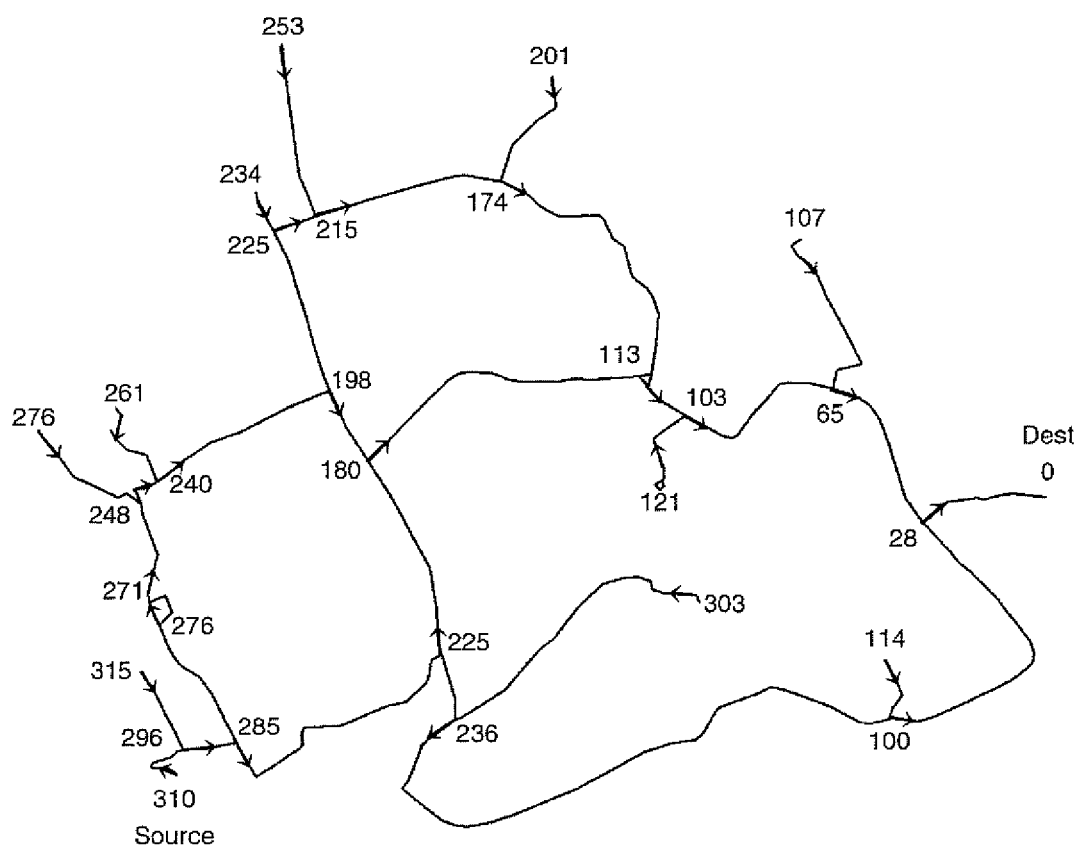
Figure 3. Destination Tree

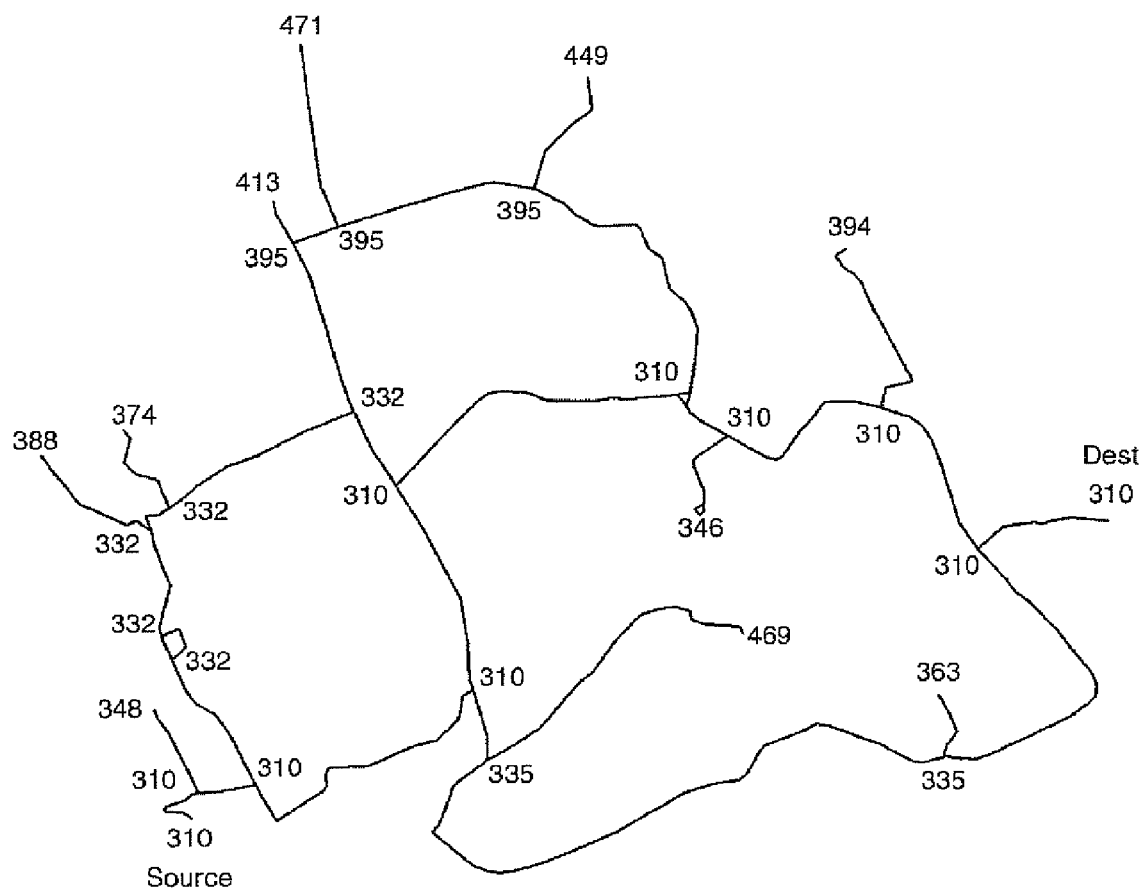
Figure 4. Combined Tree

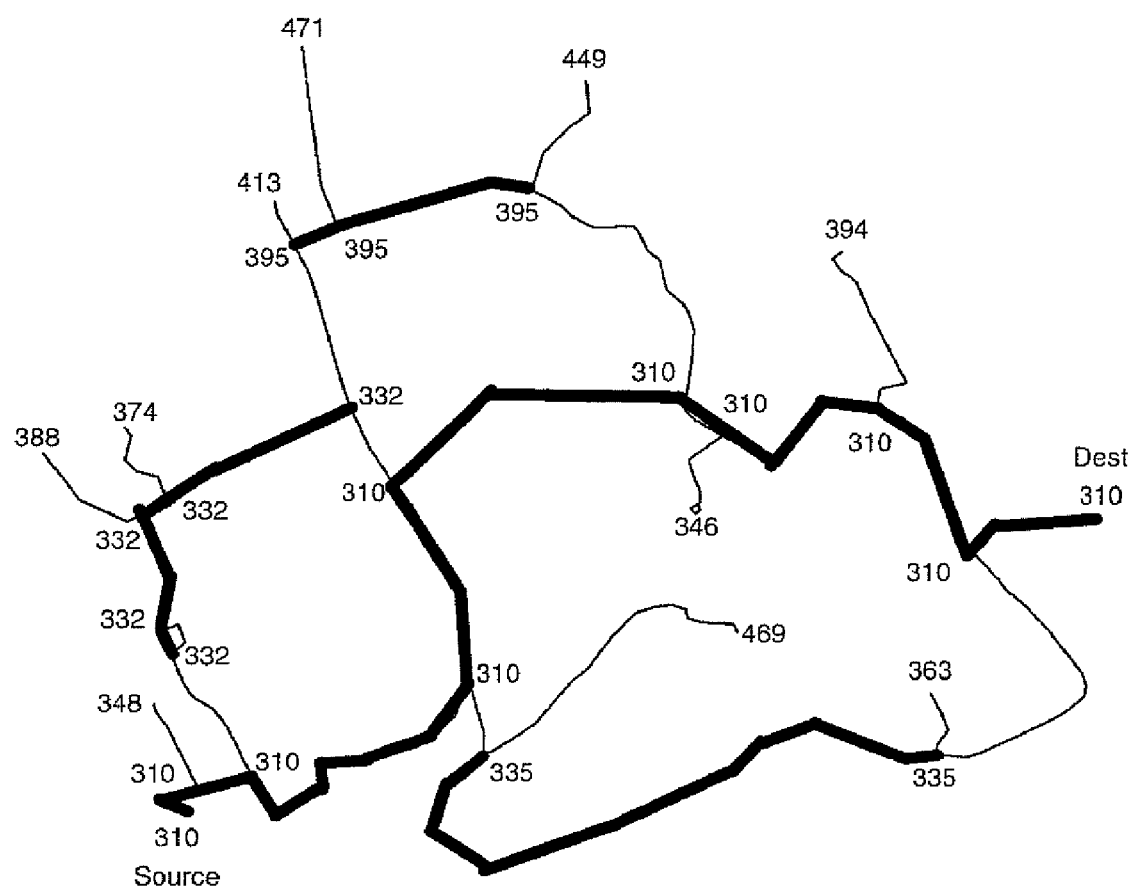
Figure 5. Plateaux

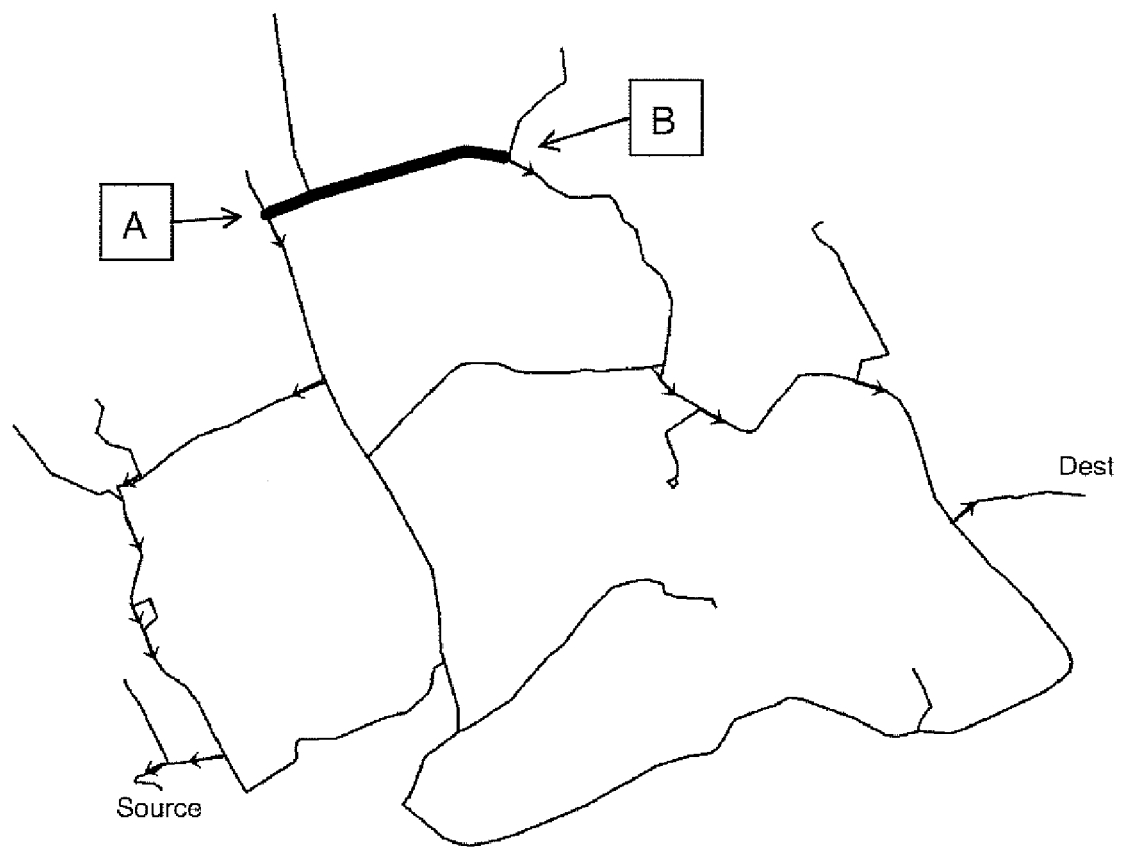
Figure 6. Plateau Goodness

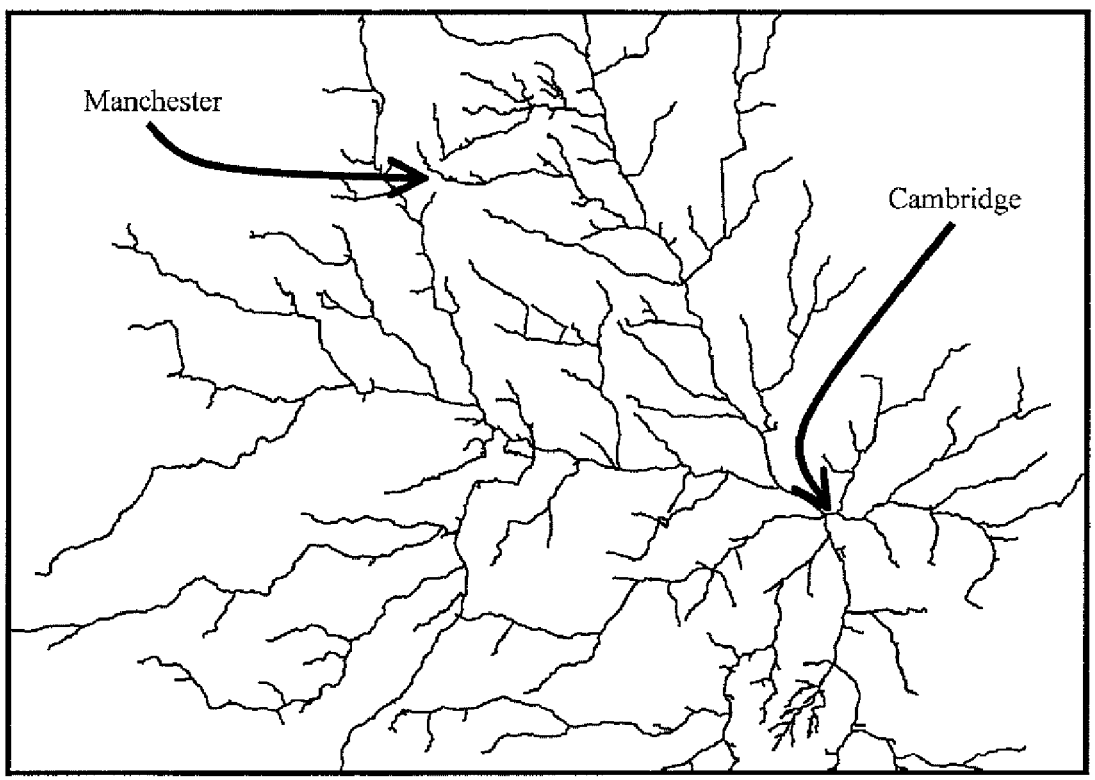
Figure 7 Source tree from Cambridge
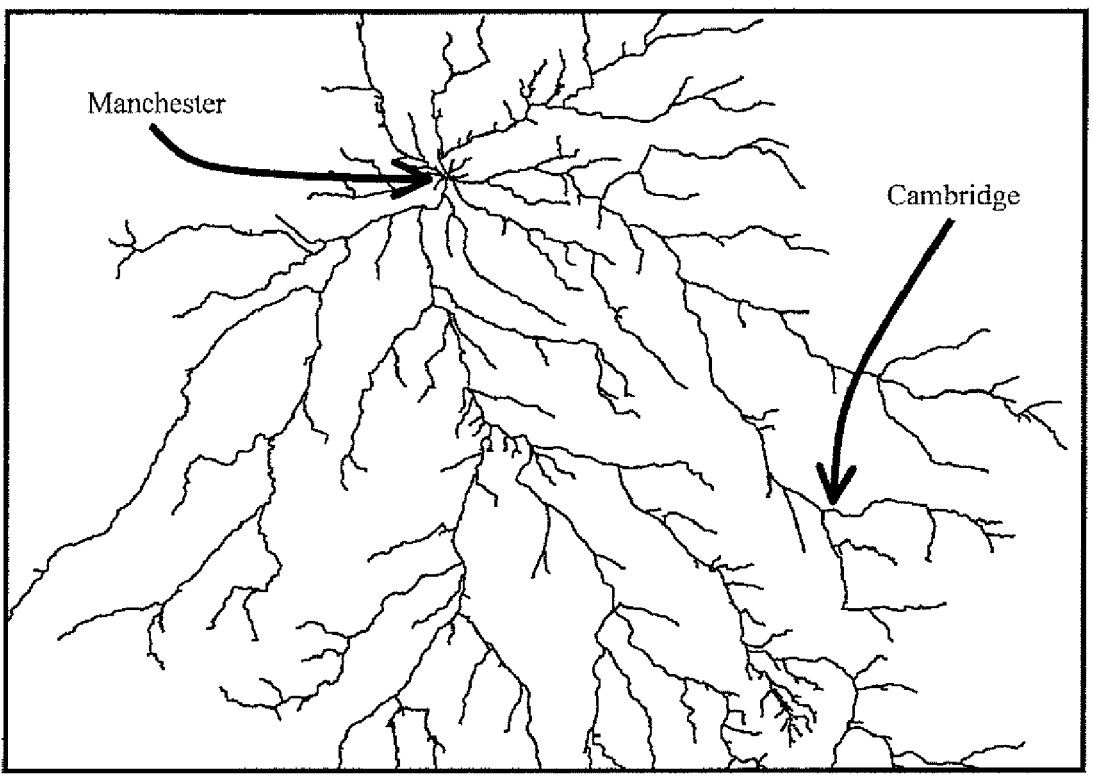
Figure 8 Destination tree to Manchester

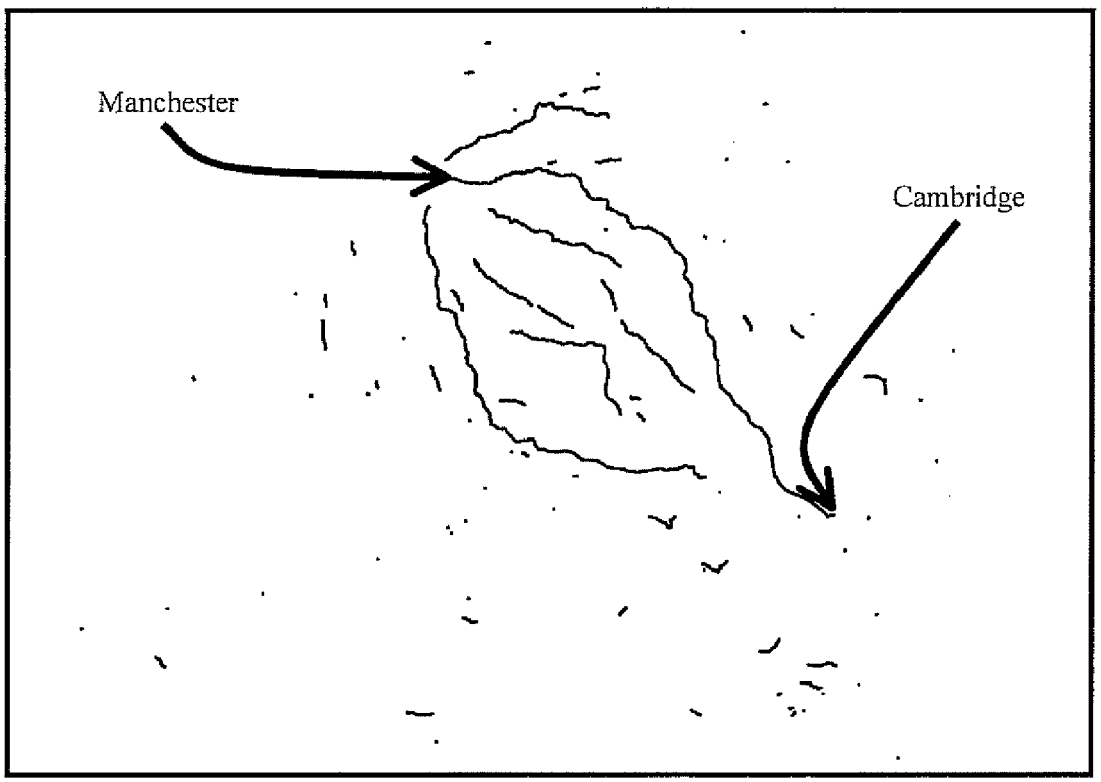
Figure 9 Combination tree
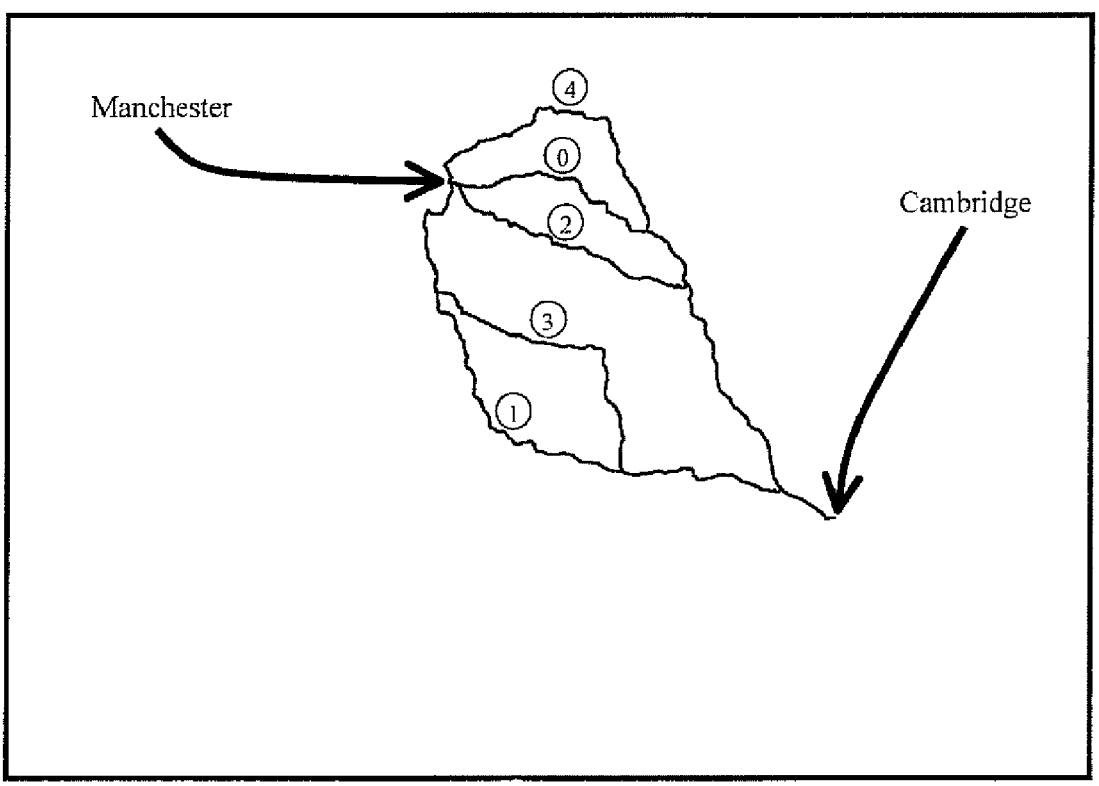
Figure 10 Plateau routes

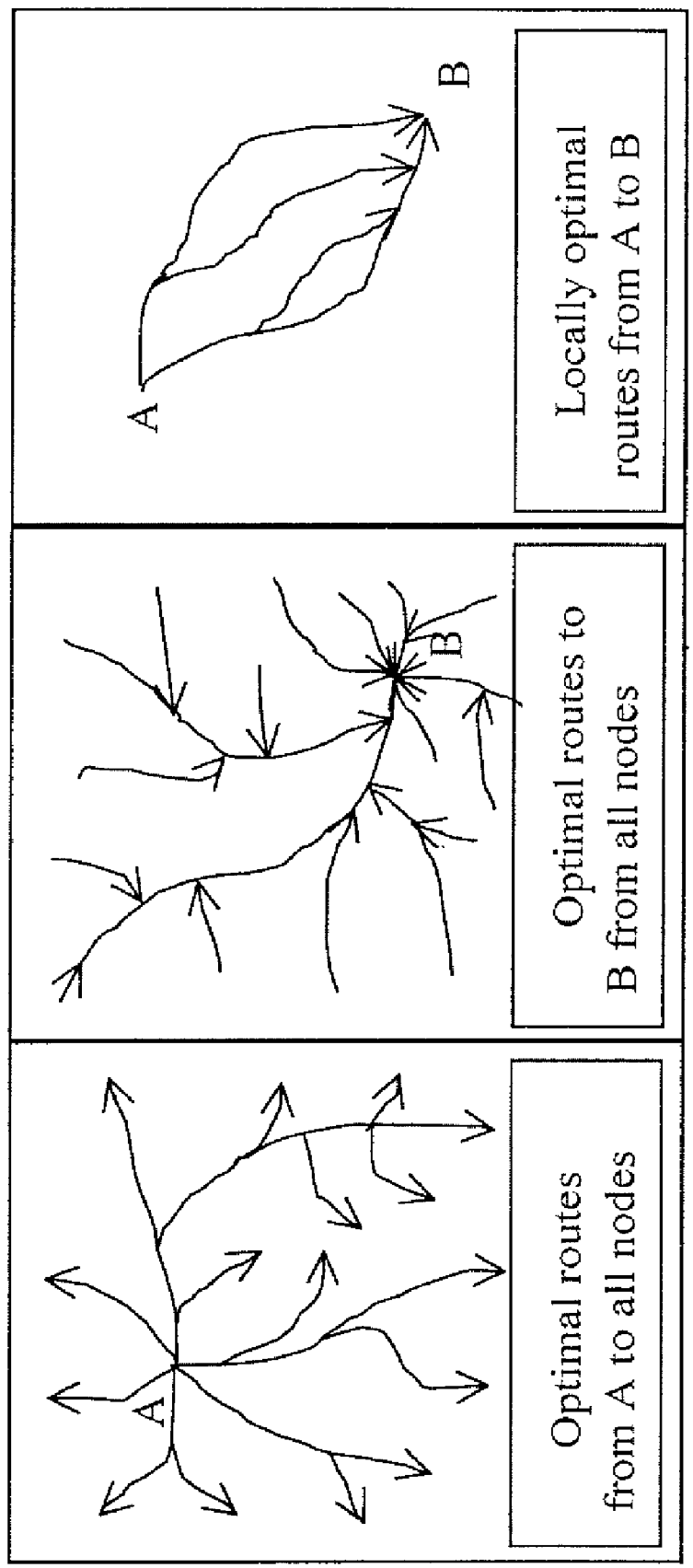
Fig 13: Locally optimal routes from A to B
Fig 12: Optimal routes to B from all nodes
Fig 11: Optimal routes from A to all nodes

| Sort by: | familiarity | motorway | time | distance | tolls |
|---|---|---|---|---|---|
| —·—·— | A14/A1/A606/A6 | | 3hrs 13min | 154mls | £4.00 |
| —··—··— | A14/A1/A57/A628 | | 3hrs 21min | 162mls | £4.00 |
| — — — — | A14/M1/A6 | | 3hrs 20min | 172mls | £10.00 |
| ———— | A14/M6 toll/M6 | | 3hrs 01min | 178mls | £14.00 |
| — —— — | A14/M6 | | 3hrs 06min | 180mls | £10.00 |

METHOD OF AND APPARATUS FOR GENERATING ROUTES

BACKGROUND OF THE INVENTION

Field of the Invention

The present invention relates to a method of and an apparatus for generating a plurality of diverse routes in a weighted directed graph.

The term "diverse routes" as used herein means routes which share the same links over less than a predetermined proportion of their lengths, typically over less than 85% of their lengths.

A graph G=<V,E> consists of a set of vertices (also known as points or nodes) V and a set of edges (also known as arcs or links) E. An edge connects two vertices u and v; v is said to be adjacent u. In a directed graph, each edge has a sense of direction from u to v and is written as an ordered pair <u,v> or u->v. In an undirected graph, an edge has no sense of direction and is written as an unordered pair {u,v} or u<->v. An undirected graph can be represented by a directed graph if every undirected edge {u,v} is represented by two directed edges <u,v> and <v,u>.

Both directed and undirected graphs may be weighted. A weight is attached to each edge. This may be used, for example, to represent the distance between two cities, the driving time, the cost of the journey, the resistance of an electrical path or some other quantity associated with the edge. The weight is sometimes called the length or cost of the edge, particularly when the graph represents a map of some kind. The weight or length of a path or a cycle is the sum of the weights or lengths of its component edges.

The methods described in this application are generally applicable to any domain where the costs can be described by a weighted directed graph, and where there are no cycles of negative cost in the graph. We will be using routing on a road network in many of our examples, but it should be understood that the techniques can equally well be applied in other domains such as routing of packets around a network of switching points, or the finding of paths for wiring in an integrated circuit, printed circuit board or a building.

Road route planners are designed to find the optimum route from source A to destination B. They define this as the single route with the minimum cost, where the cost function is a simple weighted sum of times, junction delays, distances, financial costs, type of road of the links that make up the route. The methods are often called "shortest-path" where this is understood to mean shortest in the sum of the costs, whatever they represent, not necessarily in metres. For a given cost function and road graph, there exists a lowest cost going from A to B, and this be found by using well known algorithms such as Dijkstra's algorithm. In a degenerate case, there may be a plurality of routes which share this globally lowest cost but the algorithms will find just one of them. Dijkstra's algorithm actually finds the optimum route from A to all nodes, but variations on it are designed to terminate early and to explore preferentially in the direction of B. The main constraint on the graph is that there should be no cycles with a negative overall cost, which is simple enough to satisfy for a road network where all the costs are positive.

Different route planners have slightly different road databases and cost functions. They can come up with equally plausible routes from A to B, sometimes very different from each other. It would be useful for a user to see all such plausible routes, particularly the ones that are very different from each other.

It is also common for users to find that the recommended route is not the one that they would have guessed or preferred, and so they try to make the route planner choose their route so that they can compare the time and distance. This is achieved by adding compulsory stops along the way, or by designating road links, junctions or areas that the router is to avoid, or by changing the weightings of the cost function to favour quicker, shorter, more motorway routes or other criteria. This can be quite time consuming, and one is often left wondering if there are more good routes that other people would have tried.

As an example, consider travelling from Cambridge to Manchester. One route finder suggests using the A14, then M6, M56. Another uses the M6 toll. Yet another recommends the A14 followed by the A1. These are all amongst the routes that a good human planner would choose, but how would we find the others?

The basis of most single shortest path routers is some variation of Dijkstra's algorithm.

A good original reference to this algorithm is:
E. W. Dijkstra. *A note on two problems in connexion with graphs*. Numerische Matematik 1:269-271, 1959.

These algorithms maintain the lowest cost found so far to reach any node from the source. They repeatedly select an active node (one whose outgoing links still need to be explored) with a low cost (based on different heuristics, e.g. the A* algorithm), and explore outgoing edges to see if they can reach another node at lower cost than so far recorded.

A good original reference to this A* algorithm is:
P. E. Hart, N. J. Nilsson and B. Raphael. *A formal basis for heuristic determination of minimum path cost*. IEEE Transactions on Systems Science and Cybernetics, 4:100-107, 1968.

If a node can be reached with a lower cost than that known so far, then each such node is added to the list of active nodes. Once they terminate, these algorithms have in fact found the lowest cost routes to a whole group of nodes (those with lower cost than the destination), and have effectively computed a routing tree (RT) from source to all nodes that might be useful in getting to the destination. Whatever clever pruning is performed on this tree, e.g. A* where the tree terminates in a roughly elliptical shape with foci at the source and the destination, our methods can be used to convert it into a diverse alternative route finding algorithm.

EP 1 335 315 discloses a technique for planning multiple non-diverse paths in a weighted non-directed graph. Dijkstra's algorithm is used twice; once for providing a routing tree from a start to all nodes of the graph and once for providing a routing tree specifically from a goal to all nodes. The weights from both trees are then summed to obtain the weight of going from the start to the goal via every node of the graph. Routes are tested for the ability to be topologically transformed into each other in the presence of obstacles so as to find topologically different paths. Such a technique is particularly suitable for robotic guidance.

There is a class of algorithms designed to find the K shortest paths from source to destination. Examples are Yen's (Kth shortest paths with no constraints) and Suurballe's (shortest disjoint path pair). (J. Y. Yen. *Another algorithm for finding the K shortest loopless network paths*. In Proc. of 41st Mtg. Operations Research Society of America, volume 20, 1972; J. W. Suurballe, R. E. Tarjan. *A Quick Method for Finding Shortest Pairs of Disjoint Paths*. Networks, 14:325336, pp 325-336, 1984.)

Yen's algorithm is not useful for finding good alternative routes, as the Kth shortest paths will simply be minor variations on the most optimum route. It works by repeatedly running Dijkstra's algorithm on a graph where edges and nodes are prohibited, by effectively setting their cost to infinity. In a road network, this is a non-starter for finding truly diverse routes as there is no way of knowing if the prohibited node or link is vital to one of the good alternative routes.

Suurballe's algorithm and others are designed to find edge- or node-disjoint paths. These are unhelpful for finding good alternative routes because some road segments may be shared between several of the diverse alternative routes that we would like to find, which are therefore not disjoint. They work by running Dijkstra's algorithm to find a primary route, then altering all of the link costs, and running Dijkstra's algorithm again to find a backup route.

For road route finding, we may not need such a mathematically rigorous definition of the K routes.

For example, we can find successive routes by weighting against road links that have been used in earlier routes. Unfortunately, such routes become progressively more baroque as more links are weighted against, and in many cases, several of the good routes will share a common beginning or ending, which is ruled out too early by this technique.

We can alter the road link costs or the cost function itself in an effort to generate other routes. This can be useful for expressing different user preferences such as a liking for Motorways rather than back roads, but it will not present alternative routes that share these characteristics, such as the choice between using the M6 or the M6 toll around Birmingham.

While driving, some systems can alter the costs of a subset of the road links, and recompute a route. This may be because the user has pressed a button to say that they want a diversion, or because the system has received new traffic information that changes the cost of using some links. In these cases, current systems would make another run of a single routing algorithm, and then guide the user on the new shortest path (lowest cost) route. This will usually result in a short diversion around the affected links, back onto the original route. This is a very different technique from ours as it uses new costs for the links, and then looks again for the single most optimum route, not for diverse choices.

U.S. Pat. No. 6,199,009 discloses a technique for computing several routes based on the different preference settings (quickest, shortest, combination) and allowing the user to select between them. The problem with this approach is that in most cases the routes will be similar or even identical to each other (e.g. the shortest route may also be the quickest), and a radically different route that is perhaps 5% longer will just not be shown.

Known systems guide the driver along one selected route without showing any en-route alternatives. Of course, if the driver strays from the selected route, then many commercial systems will recompute a new route, and U.S. Pat. No. 5,675,492 shows how to precompute some alternatives and even display them. These will almost always be a short diversion back onto the earlier selected route, and are not interpreted as a choice for a completely different route.

SUMMARY OF THE INVENTION

According to a first aspect of the invention, there is provided a method of generating a plurality of diverse routes from a source to a destination in a weighted directed graph, comprising the steps of: generating a source routing tree from the source to a first set of points of the graph; generating a destination routing tree from a second set of points of the graph to the destination; and combining the source and destination trees to form the routes.

The first set may comprise all of the points of the graph.

The second set may comprise all of the points of the graph.

The first and second sets may comprise points of the graph adjacent both the source and the destination.

The first and second sets may comprise the same points.

The graph may comprise a set of links, each of which has a first priority of use, and a second set of links, each of which has a second priority of use greater than the first priority. The first set of points may comprise points interconnected by the links of the first or second set in a first region of the graph containing the source and points interconnected by the links of the second set but not of the first set in a second region of the graph outside the first region. The second set of points may comprise points interconnected by the links of the first or second set in a third region of the graph containing the destination and points interconnected by the links of the second set but not of the first set in a fourth region of the graph outside the third region.

The source and destination trees may be minimum cost trees.

The combining step may comprise selecting each sub-route common to and traversed in the same direction by the source and destination trees. The source and destination trees may include back-pointers and the sub-routes may be selected by finding sequences of adjacent points which are pointed to by back-pointers of both the source and destination trees. As an alternative, the points of the source and destination trees may be associated with costs and the sub-routes may be selected by finding sequences of adjacent points for which the sums of the costs from the source and destination trees are the same. The combining step may further comprise extending each sub-route as necessary to the source and destination along the source and destination trees to form one of the routes.

The method may further comprise assigning a measure of goodness to each route. The measure may be a function of the length of the sub-route and the length of the route. The measure may be a function of the difference between the length of the sub-route and the length of the route.

The method may comprise selecting at least one via point which is not on any sub-route or extended sub-route, calculating from the source and destination trees a minimum cost route from the source via the at least one via point to the destination, and comparing the or each calculated cost with the same sum of the costs for at least one of the selected sub-routes. The method may comprise forming the difference between the or each calculated cost and the same sum for the selected sub-route. The method may comprise deselecting the or each via point for which the difference between the calculated cost and the same sum is greater than a threshold.

The method may further comprise selecting only some of the routes in accordance with the measure of goodness. The method may comprise selecting the N routes of highest measure of goodness, where N is a positive integer. The measure may comprise selecting at least some of the routes whose measures of goodness are greater than a threshold.

The method may comprise storing at least one of the routing trees.

The graph may comprise links associated with costs. The cost of traversing each of at least some of the links may vary with a parameter of traversal. The cost of traversing each of the least some of the links may vary with the time of traversal. The first of the generating steps to be performed may include calculating and storing the costs of the links for the prevailing transversal parameter values and the stored costs may be used during the second of the generating steps to be performed.

The destination tree generating step may be performed before the source tree generating step.

The routes may be ordered in accordance with at least one property of each route. The property may be the measure of goodness.

The graph may represent a road network and the routes may be road routes.

The graph may represent an integrated circuit or a printed circuit and the routes may be interconnections.

The graph may represent a wiring installation and the routes may be wiring interconnections.

The method may further comprise choosing the order of placement of the interconnections in accordance with the number of selected routes and/or the measure of goodness. The interconnections with the lowest number of selected routes may be placed first.

The graph may represent a communications network and the routes may be communication paths. The network may be an internet.

According to a second aspect of the invention, there is provided a method of navigation, including generating road routes by a method according to the first aspect of the invention.

The method may comprise presenting information about the road routes to a user. The method may comprise presenting information about a choice of routes from a point from which a plurality of the routes diverge when the user approaches the point. The information may be displayed in a form representing a road sign.

The method may comprise offering guidance to a user along a selected one of the routes. The method may comprise offering guidance, when the user leaves the selected route, to the sub-route of the selected route.

According to a third aspect of the invention, there is provided a computer program for performing a method according to the first or second aspect of the invention.

According to a fourth aspect of the invention, there is provided a computer-readable medium carrying a program according to the third aspect of the invention.

According to a fifth aspect of the invention, there is provided transmission across a communication path of a program according to the third aspect of the invention.

According to a sixth aspect of the invention, there is provided a computer programmed to perform a program according to the third aspect of the invention.

According to a seventh aspect of the invention, there is provided a computer containing a program according to the third aspect of the invention.

According to an eighth aspect of the invention, there is provided an apparatus arranged to perform a method according to the first or second aspect of the invention.

It is thus possible to provide a technique which generates a plurality of diverse routes from a source to a destination in a weighted directed graph. It is necessary only to generate two routing trees irrespective of how many routes are required. Further, it is not necessary to alter, for example, weighting or cost functions or individual link costs.

BRIEF DESCRIPTION OF THE DRAWINGS

The invention will be further described, by way of example, with reference to the accompanying drawings, in which:

FIG. 1 illustrates a small hypothetical road network;

FIG. 2 illustrates a source routing tree generated by a method constituting an embodiment of the invention;

FIG. 3 illustrates a destination routing tree generated by the method;

FIG. 4 illustrates the result of combining the routing trees of FIGS. 2 and 3;

FIG. 5 illustrates the sub-routes or plateaux derived from FIG. 4;

FIG. 6 illustrates an example of a route derived from FIG. 4;

FIG. 7 illustrates a source routing tree generated by the same or a similar method constituting an embodiment of the invention;

FIG. 8 illustrates a destination routing tree generated by the method;

FIG. 9 illustrates the result of combining the routing trees of FIGS. 7 and 8;

FIG. 10 illustrates the diverse routes generated by the method with ranking in accordance with a goodness factor;

FIG. 11 illustrates a source routing tree found by the same or a similar method for a very simple graph;

FIG. 12 illustrates a destination tree for the same graph;

FIG. 13 illustrates the diverse routes generated by combining the routing trees of FIGS. 11 and 12;

DETAILED DESCRIPTION

Figures 14, 15:
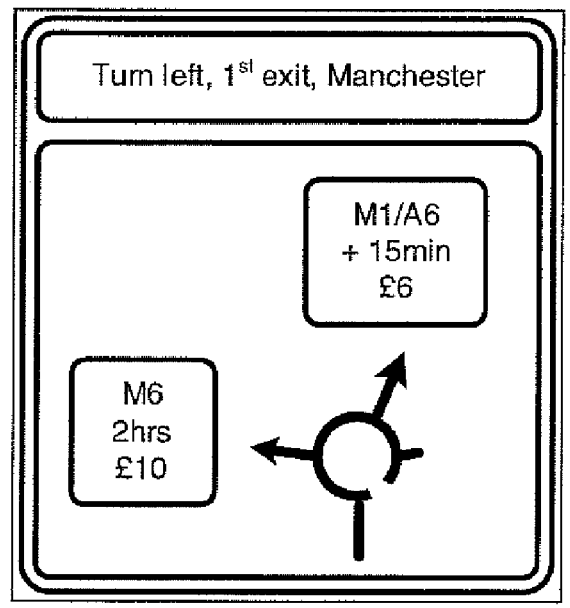
FIG. 14 illustrates an example of information display for displaying information about the generated routes to a user.
FIG. 15 illustrates a navigation display which may be presented to a user.

For purposes of initial illustration and explanation, a simple hypothetical example of diverse route generation will first be described. We will use a representation where all we know is the distances between junctions along hypothetical roads. FIG. 1 shows a tiny subset of roads with their lengths annotated in tens of metres.

We will compute routes from the end of one road (the source node, subsequently marked as "Source") to the end of another (the destination node, subsequently marked as "Dest"), and find not only the shortest route, but also several other routes that are good diverse alternatives. Of course, on such a restricted network, the alternatives take up many of the other roads, but on a real network with millions of nodes, we would still find only the few best diverse alternatives amongst the billions of possibilities.

Our subsequent detailed implementation description uses a more complex road network, which would be harder to draw, where a typical road is represented by two links, one in each direction. We then encode the costs of going from each link to each possible successor link, incorporating knowledge that includes turn delays, different conditions in each direction and forbidden turns.

Thus we will show that our method works equally well for either a node-based or a link-based representation. It should enhance any routing algorithms that are based on the computation of a shortest path (minimum cost) tree. It is independent of how those trees were arrived at, working solely from the minimum cost values and the back pointers that form the tree. From the computation of just two trees, it evaluates thousands of possible routes to find a small subset that are all good alternatives, are each locally optimal, and are globally diverse.

The first step is to compute the minimum cost tree from the source node to all other nodes. This is typically performed using a variant of Dijkstra's Algorithm or the A* Algorithm, often enhanced by clever use of trunk roads, precomputation and graph restrictions to speed up the computation or reduce the storage requirements. For our example, we show the result of this as FIG. 2.

At each end of each road segment, we have annotated the distance from the source to that end using the shortest path. From each end of each road segment, there is exactly one outgoing arrowhead that shows the way back towards the source using the shortest path. We call this a back pointer. Note that for a source tree it will be in the opposite direction to the direction of travel. These are computed and stored as a necessary part of the Dijkstra's or A* Algorithm.

For example, the shortest path from the source to the node marked as the destination (distance 310) can be traced backwards by following the arrowheads back through the nodes whose distances are 282, 245, 207, 197, 130, 85, 25, 14 and finally, 0. This is the shortest path route from source to destination, and would be traced in just this way by Dijkstra's or the A* Algorithms.

The second step is to compute the minimum cost tree to the destination node from all other nodes. This is just a variant of the previous algorithm and the output is shown as FIG. 3. This time, the annotations give the distance to the destination node along the shortest path, and the arrowheads, again exactly one from the end of each road, show the way forward to the destination using the shortest path.

For example, the shortest path to the destination from the node at the top left with distance 234 is found by following the arrowheads through the adjacent nodes whose distances are 225, 215, 174, 113, 103, 65, 28, and 0. This tree also encodes the globally shortest path, which is found by following the arrowheads from the source node through to the destination node, and will always be identical to the one found from FIG. 2.

Note the subtle difference between the trees, in that the first tree (FIG. 2) encodes the shortest path routes from a single node to many others, while the second tree (FIG. 3) encodes the shortest path to a single node from many others.

The next step in our method is, for each node, to add together the minimum costs from each tree. We call this the cost-sum. The result of this is shown in FIG. 4. For example, the number 471 at the top was arrived at by adding the corresponding numbers 218 and 253 from the tops of FIG. 2 and FIG. 3.

These numbers have a powerful interpretation. At any node P, they are the cost of the shortest path route from the source node to the destination node via the node P. Thus we have computed the set of shortest path routes from source to destination via any other node in the graph. This in itself is a powerful result, but there are a huge number of such routes, and mostly they will not be relevant when planning how to get from source to destination.

We now observe that there are chains of adjacent nodes which have the same cost-sum. Of course, the nodes that lie along the shortest path route from source to destination must all have the same cost-sum, which is exactly the cost of the shortest path route. However, there are other such chains. In this example, they have cost-sums of 310, 332, 335 and 395, and are highlighted with bold lines in FIG. 5. We call each of the maximal-length chains with the same cost-sum a plateau, as if the cost-sum represented the height above some mythical plane.

To find these plateau chains, a variety of known algorithms could be used. We will describe a typical example.

For this example, we begin by giving each node a single bit that indicates that we have visited it, initially 0 for not-visited. We then scan over every node in turn, the order does not matter. If it is marked as visited (1), we move on to the next node in the scan. If the node is marked as not-visited (0), then we change that to 1 to indicate that we have visited it. For each such newly-marked node, call it node Q, we begin a list of adjacent nodes in the chain by adding just a reference to that node Q. We then follow the link (arrowhead) in the source tree to an adjacent node, say node R1, and if it has the same cost-sum, we mark it as visited and we add a reference to R1 to the list and repeat for R2 etc. When this has finished, we return to the node Q, and follow the link (arrowhead) in the destination tree to an adjacent node S1. If the cost-sum at S1 is the same as for node Q, then we add a reference to S1 to the list and mark S1 as visited. We then follow the link (arrowhead) in the destination tree from S1 to a new node S2, and again, add it to the list and mark it as visited if it has the same cost-sum as node Q. When this has finished, we have a list that comprises all of the nodes in the chain that node Q is a part of.

At this point we compute a goodness factor for the chain, and keep it in the list only if it is one of the best n found so far, where n is typically 5, but could for example be 1000. W*e* will describe the goodness factor *later*.

We then continue to the next node in the scan.

A plateau is formed when the source and destination trees traverse a chain of road segments in the same directions. This indicates that the chain is both useful for getting away from the source, and for getting towards the destination. This is a powerful indication that the chain may be useful for getting from the source to the destination. Such chains tend to use the best roads in their vicinity, and are aligned to help in getting from source to destination. On a real road network with millions of nodes, there are many thousands of such chains, many of them very short.

To make a complete route out of a Plateau, we simply have to follow the arrowheads in the source and destination trees back to the source and destination nodes themselves. FIG. 6 shows the relevant arrowheads for the plateau whose combined cost (call it CC) was 395 in FIG. 5. This route is the shortest path route from source to destination that incorporates the plateau.

For that plateau, its length (call it L) is simply the difference in the values at nodes A and B from the source tree (221−170=51 from FIG. 2) or the destination tree (225−174=51 from FIG. 3).

The shortest path route from source to plateau has a length (call it SP) equal to the smaller of the values at A or B from the source tree (min(170,221)=170 from FIG. 2). So SP=170.

The shortest path route from plateau to destination has a length (call it PD) equal to the smaller of the values at A and B from the destination tree (min(225,174)=174 from FIG. 3). So PD=174.

Thus the total length of the optimum route that incorporates the plateau is given by SP+L+PD, which in this case is 170+51+174=395. This value must be exactly the length of the shortest path route from source to destination via any one of the nodes in the plateau, which we have already found as the combined cost CC from the combined tree (FIG. 4).

A useful plateau for getting from source to destination will tend to be longer than those that are less useful, as it indicates a long stretch of route that is fast and well-aligned compared to others in its vicinity. Thus we are looking for a larger value of L.

A useful plateau for getting from source to destination will tend to be part of a route that is not too long, as we are not interested in long plateaux if they are found at a great distance from both source and destination. Thus we are looking for a smaller value of SP+L+PD.

Thus a good first estimate of the "goodness" of a plateau is the length of the plateau minus the length of the route that the plateau is a part of, which is L−(SP+L+PD)=−(SP+PD). In our example it is −(170+174)=−344. In general, for more complex representations, it will be the cost of traversing the plateau minus the cost of the entire route. This is a negative number.

To make this measure independent of the length units (or in general, the cost units), we divide it by the length (cost) of the globally shortest path route, which in this case is 310. Thus our raw goodness (call it RG) is −344/310=−1.11.

To make this more palatable to use, we can transform it by any function that preserves its ordering. We call the resulting value the "goodness" or G for short. The function that we shall use hereafter is $G=100-99^{-RG}$ It is chosen so that the optimum route has a goodness G of 99, routes where the route outside the plateau is up to 85% of the optimum route length (RG=−0.85 or more positive) have a value of G greater than 50, routes where the route outside the plateau is about the same as the optimum route have a value of G around 1 (there are usually thousands of these, they are all the minor variations on the globally optimum route), and worse routes have a value less than 1, which can go rapidly negative.

The other chains shown in bold in FIG. 5 have the following values:

| CC | SP | L | PD | −(SP + PD) | RG = −(SP + PD)/310 | G |
|---|---|---|---|---|---|---|
| 395 | 170 | 51 | 174 | −344 | −1.11 | −64 |
| 335 | 99 | 136 | 100 | −199 | −0.64 | 81 |
| 332 | 56 | 78 | 198 | −254 | −0.82 | 57 |
| 310 | 0 | 310 | 0 | 0 | 0 | 99 |

For presentation to the user, we can use the values of G as a threshold, and a value of G>50 gives good results. If they wish to see more routes, we can always keep more, down to some lower threshold, say G>10. Typically, this will be accomplished by the user asking for more alternatives, or altering the threshold value for G. This should not be necessary for the average user.

In testing on the complete Great Britain road network, from Cambridge to Canterbury, there is only one route with G>50. This uses motorways for almost the entire length, namely the M11, M25 and M2. For purposes of investigation, we relaxed the threshold, but the routes with G<50 were not at all appealing because those motorways are so well aligned and bounded by poor roads in London to the West and the sea to the East.

For some applications, if there turn out to be many routes with G>50, then we may choose to limit the number shown to avoid overloading the user, typically showing only the 5 routes with the highest values of G. Again, the user can be allowed to change this parameter if they so wish, but we find that the top 5 usually encompass the most appealing routes.

For a desktop route planner, we might show all routes with G>50, but when planning in a vehicle or on a PDA, we may show only the top 5.

In testing on the Great Britain network, an example of this would be Cambridge to Manchester, where there are 8 good alternative routes with G>50, but the top 5 probably encompass the most popular choices.

The function that is used to find the minimum cost route (in Dijkstra's or A* Algorithm for instance) can be much more complex that simply the distance traveled. In most situations, it is in fact dominated by the time taken, but may also be influenced, for example, by type of road, familiarity to the driver, financial costs, safety record in ways that are already known. We would typically use the best available time-independent cost function in the computation of the plateaux. It is simply a matter of labelling the roads with the appropriate cost instead of the distance, and the rest of the algorithm including the thresholding remains the same.

Time dependent information could be used in the computation of the plateaux, but care would have to be taken that only one cost is associated with each road segment. Otherwise the source and destination trees might have different costs for the same segment, which would prevent us from identifying the chains using the Combined Cost (CC) values. A method of overcoming this is presented below.

An alternative method for handling time-dependent information is to compute the good alternative routes using the time-independent parts of the cost, and then compute the time-dependent factors for presentation to the user. Time dependent factors include the extra time taken due to congestion, variable toll costs and time-varying road charges. In this way, a user can see how the good geographical routes have been affected by the time-varying factors, and decide for themselves if a journey at another time might be more appropriate, or which route they would still like to select. For example, a driver's usual route may have become five minutes slower than the optimum due to congestion, but if they were given the choice, they may well wish to choose their usual route anyway. On another day, they might make the choice another way. The computer will never know enough to make this decision correctly under all circumstances, and so the driver should be informed about the realistic choices with the computer having done the hard work of estimating the distances, times, costs etc. of each choice.

If the costs are allowed to differ between the source and destination trees, perhaps because they are time-dependent and the estimates of traversal time are necessarily different, then we could not use the CC values to find the plateaux. An alternative is to use the back-pointers in the source and destination trees (arrowheads in FIG. 2 and FIG. 3) to identify the links which form the plateaux. That is, to find consecutive links that are traversed in the same driving direction (but arrowheads in opposite directions) in both the source and destination trees. Any link that has an arrowhead on it in one direction in the source tree, and the other direction in the destination tree, is part of such a chain, and the plateau is found by combining all adjacent links that also have that property using a scan technique similar to that described above.

Once we have reduced the number of plateaux to the most interesting ones by using G values, we can filter them in many other ways. For example, we may choose to order them based upon user preferences (motorways, fewer junctions, lower tolls, driving costs, familiarity). We can also show the user how historical and real-time traffic information has altered our estimates of how long a journey will take, so that they can see why some particular route has become the fastest today, and how it compares with the others that they might be used to. The user, especially at the desktop, can be given the ability to sort the good alternative routes by any of these factors at the click of a mouse button.

We would typically present the advanced user with two controls for occasional use, one which sets the threshold value that G must exceed (default 50), and one that limits the number of alternatives displayed (default 5).

In our example above, the table shows that with a threshold of G>50, we would only recommend the routes generated from the plateaux with Combined Costs (CC) of 310, 332 and 335. Note that these happen to be the lowest values of the combined costs in the table, but that need not always be the case. Also note that all these routes have a cost that is within 10% of the globally optimum route, so other factors known only to the driver may easily outweigh the little extra distances involved, and they will be glad to have seen them all.

We would typically present the routes sorted in order of goodness, which conveniently means that the first one will be the globally optimum route with goodness 99. We can present other computed factors such as time, distance, cost in the columns of a table, and allow the user to sort and display according to these other factors if they so wish.

There are already systems that can compute alternative routes at the request of the user, either by disallowing the next link, or all links for some distance ahead in the planned route, and then finding the single most globally optimum route given those new constraints. They typically find a short diversionary route around the problem area, and then head back onto the original route, although sometimes they may find an altogether different route. Our technique could also be used at this time, and could present more choices, but it may be inadvisable to distract the driver with such information. Rather, our techniques could be made available as an extra option to complement the diversionary function.

For purposes of further illustration and explanation, a relatively simple actual example of a diverse route generating method is now described. This is illustrated in FIGS. 7 to 10, which are maps drawn to the same scale and extent. The example chosen is routes from Cambridge, UK to Manchester, UK.

The first step is to compute the tree containing the best (minimum-cost) routes from Cambridge to all other points. This is shown in FIG. 7.

The tree has been simplified for printing, showing only its major branches, as the leaves of the full tree would fill the land almost completely at this scale. Methods for computing such trees are well-known in the art, and include the Dijkstra and A* Algorithms.

The second step is to compute the tree containing the best (minimum-cost) routes to Manchester from all other points. This is shown in FIG. 8.

The third step is to find roads that are traversed in the same direction in both trees, that is, away from Cambridge in FIG. 7, and towards Manchester in FIG. 8. Such roads are not simply the overlap of the two trees, as the direction of traversal is important. The resulting roads are shown in FIG. 9.

The fourth step, whose output is shown in FIG. 10, begins by selecting the chains of roads from FIG. 9 that are the longest, and generating complete routes from each by linking their endpoints back to Cambridge using the source tree of FIG. 7, and back to Manchester using the destination tree of FIG. 8. The routes are then ranked according to their goodness (the cost of the overlapping chain minus the cost of the entire route), and in this case, we have chosen to display the top five, numbered from 0 to 4 in order of goodness.

The final step in this embodiment is to display relevant information to the user, such as that shown in Table 1.

TABLE 1

| Plateau ID | Description | Duration | Distance |
| --- | --- | --- | --- |
| 0 | A14, A1, A57, M1, A628 | 2 hrs 40 min | 256 km |
| 1 | A14, M6, A556, M56, A5103 | 2 hrs 41 min | 284 km |
| 2 | A14, A1, A617, A623, A6 | 2 hrs 55 min | 249 km |
| 3 | A14, M1, A50, A500, M6 | 2 hrs 50 min | 290 km |
| 4 | A14, A1(M), A1, M62, A56 | 2 hrs 53 min | 297 km |

A more comprehensive example of a diverse route generator and its application in a vehicle navigation system will now be described. Headings are provided for convenience.

Routing Trees

To find these useful chains, we first look at routes from A to all nodes, and from all nodes to B. We can compute the optimum routes from A to all nodes using Dijkstra's algorithm, and observe that these can be stored in a single tree structure, a Routing Tree from A (RTa), where each node or link contains a pointer to the previous one along the optimum route. FIG. 11 shows a simple example to illustrate such a tree. The node or link can also contain the cost of the optimum route to that point. This tree has a tendency to use roads that are locally optimal and that are aligned well for getting away from A. By locally optimal, we mean that there are no minor diversions off those routes that can lower the overall cost.

We then compute a second Routing Tree that stores the most optimum paths from all nodes to B (RTb). This tree favours road segments that are locally fast and useful for getting towards B and FIG. 12 shows the resulting tree for the example illustrated in FIG. 11.

Combining Trees

Now, we combine the two RTs to find chains of nodes that are used in the same direction in both trees. These chains are useful in travelling away from A, and for travelling towards B. To generate a complete route from such a chain, we trace back to A from the beginning of the chain using RTa, and trace forward to B from the end of the chain using RTb. The resulting routes for the example of FIG. 11 are illustrated in FIG. 13. This route will be locally optimal. That is, there does not exist any small deviation from it which has a lower overall cost for getting from A to B. If there was such a deviation from the chain, then the chain would have formed at the lower cost deviated route, and if there was such a deviation from the traced ends of the route, then the appropriate Routing Tree (RTa or RTb) could not have been optimal.

Note that although the routes generated from these chains are locally optimal, they are not globally optimal. There is, in general, only one globally optimal route, which is the one found by single routers such as Dijkstra's algorithm. The next most optimal route will usually be a minor variation upon the first, with only a tiny increase in cost. For example, on a three hour road journey that begins and ends in cities, there will be potentially hundreds of small deviations through side roads that add mere minutes to the computed journey time. All of their permutations will generate millions of routes with journey times up to, say three hours and ten minutes. Only after that might we see the first journey that used a very different route between the cities, and takes an extra 12 minutes. This journey will also have potentially millions of small variations that are all just slightly more costly, but it will be a local optimum. Of course, even though it is the one millionth shortest route, it may still be a completely viable alternative, as the journey time estimates probably have an error of +−10 minutes, and if we are presented with the choice, we can take into account other factors such as how pleasant we find the route to drive, how familiar we are with it, the importance of financial cost versus time on this occasion etc.

Of course, there are many such chains, although an upper bound on their number is the number of edges in the graph, but they can be characterised by the length (in general, the cost) of the overlapping chain of road segments (which we call a plateau), and the length (cost) of road for the optimum route that uses that chain. The cost information for this is already available in the RTs data, so this is a very efficient way to assess the goodness of the alternative routes. We have found an appropriate goodness function that not only orders the best diverse routes from the global optimum downwards, but which also provides a dimensionless threshold to ascertain how many alternatives are really useful.

Using this method, we can compute the N best diverse alternative routes from A to B in a time which is dominated by running Dijkstra's algorithm twice. We can assess and order thousands of such routes in much less time than running Dijkstra's algorithm, although usually there will be less than a dozen with a goodness factor above the threshold.

In some implementations of known single routers (shortest single path from A to B), it may be desirable to use a variation of Dijkstra's algorithm. These use special heuristics to explore the nodes or edges in a better order, or to terminate earlier, or to explore major roads only, or to explore outwards from source and destination simultaneously. They do this in order to run faster or to use less memory. It should be understood that our method of combining RTs to find plateaux is independent of how the RTs were computed, so if these variations are appropriate, then our method can be applied to them to yield diverse alternative routes while taking advantage of their better running time or memory use characteristics.

Cost Function

The cost function that is used to compute the best diverse alternative routes (the choice routes) can incorporate any of the known factors. It may be sensitive to both time and duration, can incorporate real-time or historical traffic information, can take into account user preferences, and can use financial information such as road pricing.

However, in a preferred embodiment, we use a basic cost function that weights mostly for time, with a small allowance for distance. This will generate most of the routes that a person might consider for getting from A to B. We can then present them in a route planner with data for each that gives the time, distance, financial cost, congestion information, and any other parameters that can be computed such as number of turns, safety. We can compute these for different times of day, days of week, different types of vehicle, all very simply as we have only to consider the handful of choice routes found in the first step. Now we have put the user in the loop so that they can quickly see where each route goes, and make their decision based upon whatever weighting they wish to give the different cost criteria.

We believe that this will become particularly important if road user charging becomes commonplace, as it will not be possible to balance time, distance and charges in a way that is correct for all journeys, and certainly not for all users. Even the same user on the same day may have different priorities depending upon whether they have a fixed deadline for completing their journey, are becoming tired, or are just short of cash. They may normally prefer a much shorter non-motorway route, but might change their mind if the alternatives involve a lot of turns.

Choice Presentation

Another problem with known route planners is that the user may wonder why some other route was not recommended. By showing them the alternative routes along with their characteristics, it is easy for the user to see how their alternative route compares to the best, and to make an appropriate choice. For example, the usual route may be subject to unusually high congestion, or an alternative route may have become preferable because of the construction of a bypass.

In a route planning tool, we could highlight the different routes using different colours, and present a text box with relevant details about each route such as time, cost etc. An example of such a text box for the Cambridge to Manchester routes described hereinbefore is shown in FIG. 14. Selecting a route on the map could highlight the relevant line in the text box, and selecting a line in the text box could highlight the relevant route on the map. In this way, a user could make their choice of route with as much information as we can give.

Instead of presenting the choice routes all at once in a route planning tool, we can consider other user interfaces. For example, for en-route guidance we would not wish to distract the driver with maps showing the alternatives. Rather, we can compute the points in the journey where a choice can be made, which we call Choice Points, and inform the driver as they approach them. For the example of the six best routes from Cambridge to Manchester, the driver will be presented with choices at most three times during their journey. Further, these can be presented with a relevant subset of the information available, perhaps as a junction diagram, rather like roadside junction signage as illustrated in FIG. 15. Such diagrams are commonly used in car navigation systems, and show the driver the correct turn to make to stay on the optimum route. Our system would differ when a choice point was approached. We would show the junction diagram with both the optimum route and any other choice routes highlighted. We would augment this with information such as a brief summary of the roads used, the relative times to their destination, and the financial costs. These could be shown in the form of a road sign (and should be no more distracting than that), and can also be read out using voice synthesis. It could take the form of "At roundabout take first exit for M6 and M56, or for ten minutes longer and seven pounds cheaper, take second exit for M1 and A6". This could be especially useful where traffic information has been taken into account and the user may be wondering why the optimum route is not the one that they expected. The time or cost saved will make this clear to them.

The Choice Points themselves are straightforward to find once the Choice Routes are known, by following the small number of Choice Routes from the Source Link to the Destination Link. We begin with the Source Link, which is found at the beginning of every Choice Route. If the next link on every Choice Route is the same, then we move on to that. If the next link is different on different routes, then we have reached a choice point, and follow each route separately as if we had just begun again at the source link. We finish when each route arrives at the Destination Link. We can either compute all of the Choice points as we begin the journey, or we can compute them as we go, always keeping at least one known in advance.

There are other methods that could be used to compute the choice points, such as marking all of the links used by one Choice Route, then marking each other Choice Route, noting where it encounters changes from marked to unmarked nodes (a choice point) and back to marked points (a point of convergence). Any of these methods can be used to determine the choice points, and can be chosen according to the precise needs of the application.

Constructive, not Destructive

An important property of our method is that it is constructive, finding all the good roads simultaneously, and assessing them using the very best weightings in the cost function and without having to blindly alter the cost elements of individual road links. Methods that alter the weightings or individual cost elements to cause the most optimum route to become less optimum can never be sure that they have not also lowered the optimality of the other good routes, as yet unknown, which will therefore never be found.

We believe that our method is the first such method to be discovered, as all the others that we have found in our research involve the alteration of the weightings or the costs of using individual road elements. Some even operate by disallowing one or more road elements used by previously found routes, equivalent to artificially giving them a cost of infinity.

Representation of Road Graph

There are a variety of representations that can be used for the weighted directed graph. For road networks for example, we may represent junctions as nodes in the graph, and road links between them as edges in the graph. To represent the costs of traversing the roads, for example the distance and average time taken to traverse a length of road between junctions, we can assign costs to the edges. To represent the costs of passing through a junction, for example the time taken to proceed straight on, or to turn left or right, we can assign costs to a node that are dependent on the edge used to reach the node, and the edge used to leave that node. Many variations on this representation are possible, and our methods should be applicable to all of them.

For this implementation, we use a representation that is particularly fast for computing the routing trees. This representation does not represent road junctions as nodes. Instead, each edge is uni-directional, so a stretch of two-way road is represented by two edges, one for each direction of travel, and these strictly form the nodes of the graph. This allows us to encode different delays for each direction of travel, which may be important at times of congestion. We call each edge a Link.

To encode the properties of junctions, each Link has a set of pointers to the next Links that can be reached from it in the graph. These are called the NextLinks. These NextLink pointers are strictly the edges of the graph. Associated with each such pointer are the costs (in time, distance, financial cost etc.) of moving from the original Link to the next one. Our implementation chooses to use the time taken to move from the midpoint of one Link edge to the midpoint of another (NextLinkTime), but others may choose to use the beginning of the Links, or their ends, it makes no difference to the outcome. We store the length of each Link (in LinkDistance), and compute the distance from the middle of one link to the middle of the next by adding the lengths and dividing by two. In this way, we have encoded both the cost of traversing a length of road, and the costs of using the junction for a particular turn, in one NextLink, which makes computing all of the optimum routes from a source edge or node to other edges or nodes particularly efficient.

For computing optimum routes to a particular destination Link rather than from a source Link, we give each Link a set of PrevLinks, which encode the costs of entering that Link from all possible predecessor Links, that is, the segments of road from which it can be entered. There is some redundancy here, as every Prevlink has a corresponding NextLink, so we use more memory than some representations, but we have a lower running time.

Figure 16:
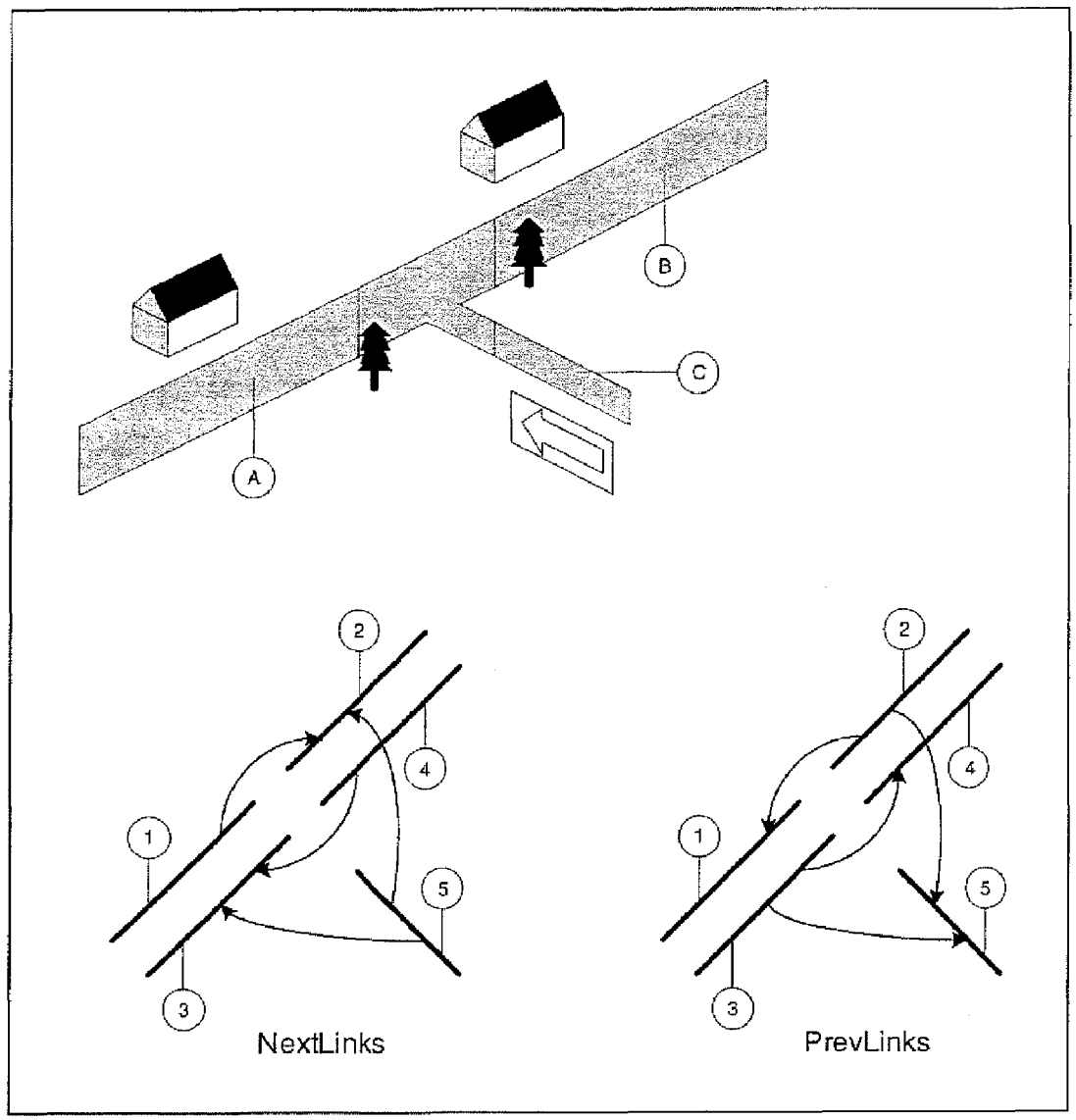
FIG. 16 illustrates how a road junction may be analysed within the method.

FIG. 16 shows a picture of a road junction, where the side road is one-way towards the junction. The section of road marked A is represented by two links, marked 1 and 3, as it is a two-way road. Similarly, road segment B is represented by two links, 2 and 4. Road segment C is only represented by one link, 5, as it is a one-way road towards the junction.

Now, vehicles travelling towards the junction on road segment A can only continue on to segment B, so there is only one NextLink (arrow) emanating from link 1, which points to link 2. Similarly, vehicles travelling towards the junction on road segment B can only continue on segment A, so there is a NextLink emanating from link 4 which points to link 3. Vehicles travelling on road segment C towards the junction can turn onto either segment A or segment B travelling away from the junction, so the corresponding link 5 has two NextLinks emanating from it, pointing to links 2 and 3. An important factor here is that the NextLinks can be enumerated from the link from which they emanate, not from the links that they point towards.

The PrevLinks are the inverse of the NextLinks, and are again enumerated from the link that they emanate from. They indicate the links from which vehicles may enter this link. For example, vehicles may enter road segment A at this junction from either road segment B or C, so link 3 has PrevLinks that point to link 4 and to link 5.

This link data is stored as a set of files, one for each type of information, that can easily be mapped into memory for efficient access. Each link is given a simple integer ID, length 32 bits, from 0 upwards, which is then used as an offset into various files. We shall use linkID 435 as an example. The length of link 435 will be found at the $435^{th}$ 16-bit word of file LinkDistance, encoded as the length in metres in 16 bits. The links that can be reached from link 435, its NextLinks, have 32-bit linkIDs in a file called NextLinks. The $435^{th}$ 32-bit word in file NextLinkIndex gives the offset in the file NextLinks where the linkIDs of the next links will be found, contiguously. The number of them is found at the $435^{th}$ 8-bit word in file NextLinkCount. The time taken to move to a particular NextLink is given in the file NextLinkTime, also indexed by NextLinkIndex and NextLinkCount.

We also add a Master file that stores the number of links (nLinks), the number of NextLinks (nNextLinks) and the number of PrevLinks (nPrevLinks). In general, nPrevLinks=nNextLinks.

Here are the file definitions so far, with the number of elements in the file given in square brackets after the file name, followed by the type of each element:

File Descriptions:

Master[3]: INT32: Contains the number of links (nLinks) and the number of next-links (nNextLinks), and prev-links (nPrevLinks) and maybe other top level information about how the files were generated etc. So far, all three fields are INT32.

All the other files are simple arrays. A link is defined by its link index, an integer between 0 and nLinks−1, which indexes all of the arrays contained in files whose length is a multiple of [nLinks].

NextLinkIndex[nLinks]: INT32: Contains the offset in the NextLinks file where the next links can be found NextLinkCount[nLinks]: INT8: Contains the number of next links NextLinks[nNextLinks]: INT32: Contains the next links (by index) that can be accessed from one link A similar set of 3 files called PrevLink . . . encode the routing tree for destination routing.

PrevLinkIndex[nLinks]: INT32: Contains the offset in the NextLinks file where the next links can be found PrevLinkCount[nLinks]: INT8: Contains the number of next links PrevLinks[nPrevLinks]: INT32: Contains the next links (by index) that can be accessed from one link
LinkType[nLinks]: INT8: The type of the road link. 0 is fast, 255 is slow.
NextLinkTime[nNextlinks]: INT32: The incremental time (milliseconds) taken to get from the middle of this link to the middle of the next link (including junction delay)
PrevLinkTime[nPrevlinks]: INT32: The incremental time (milliseconds) taken to get from the middle of the previous link to the middle of this link (including junction delay)
LinkDistance[nLinks]: INT16: The incremental distance (metres) when using this link Routing, Algorithm, Source Tree The routing algorithm that we use (a version of Dijkstra's algorithm) to construct the min-cost routes from a given link to all other links (the Source Routing Tree) is as follows:

Begin with all links having a min-cost which is the minimum cost found so far for reaching that link. Make it infinity for all links except the origin of the route (the origin link), for which the min-cost is zero. Construct a variable length list of active nodes, those for which we have not yet explored all of their outgoing links. Populate this list initially with the source link alone.

REPEAT this:

If the active list is empty, then we have finished and we return.

Otherwise remove the first active link from the list of active links and call it linkP.

It has a min-cost costP that we know we can reach it with.

For each outgoing link linkPN, add the incremental cost costPN of going from linkP to linkN, and see if it is less than the min-cost (costN) stored with the outgoing link. If so, update costN with the lower value, update the back-pointer of linkN to refer to linkP, and add linkN onto the list of active links (if it is not already there).

When this algorithm terminates, we have constructed the Routing Tree.

Storage of Routing Tree

In our implementation, we may wish to re-use previously computed Routing trees, so we store each one in the filing system as three files. Different trees are distinguished by using a trailing integer value <n> on each file. For example, TTBackIndex1 contains the back pointers for tree 1. By convention, the trees for the currently selected source and destination links are stored in files where n is 0 and 1. Again, the file lengths are given in square brackets after the file name:

File Descriptions:
TTMaster<n>[4]: A series of INT32s: nLinks, fromSource (0=dest, 1=source), rootLinkIndex, rootSubnodeIndex.
TTBackIndex<n>[nLinks]: INT32: The link that was used to get to this link at lowest cost, for tree <n>. Works for Next or Prev (source or destination) trees.
TTMinCost<n>[nLinks]: INT32: The minimum cost found to get to this link, for tree <n>

Tracing Back the Optimum Route

To find the optimum route from the source link linkA to the destination link linkB, we need only use the TTBackIndex0 file. For example, suppose that linkB had ID 678,123. The link that led us to linkB along the optimum route is found at offset 678,123 in the file TTBackIndex0. Suppose this link had ID 1,456,789. The link that led us to this one along the optimum route is found at offset 1,456,789 in the file TTBackIndex0. We keep repeating this until the link ID extracted from the file matches the linkID of the source link linkA. Then we have extracted all of the link IDs of the optimum (shortest) path in reverse order. This is a common way of extracting the shortest path once Dijkstra's algorithm has terminated.

This extraction also works to find the shortest path from linkA to any other link linkC in the graph, so long as we have allowed the Routing Algorithm to run until there were no more active nodes. If the routing algorithm was terminated early, then we can only use the tree to find the optimum route to a subset of the nodes in the graph.

Routing Algorithm, Destination Tree

The routing algorithm that we use (a version of Dijkstra's algorithm) to construct the min-cost routes from all links to a given link (the Destination Routing Tree) is as follows:

Begin with all links having a min-cost which is the minimum cost found so far for travelling from that link to the destination link. Make it infinity for all links except the destination of the route (the destination link), for which the min-cost is zero. Construct a variable length list of active nodes, those for which we have not yet explored all of their incoming links. Populate this list initially with the destination link alone.

REPEAT this:

If the active list is empty, then we have finished and we return.

Otherwise remove the first active link from the list of active links and call it linkQ.

It has a min-cost costQ that we know we can reach the destination with.

For each incoming link linkNQ, add the incremental cost costNQ of going from linkN to linkQ, and see if it is less than the min-cost (costN) stored with the incoming link. If so, update costN with the lower value, update the back-pointer of linkN to refer to linkQ, and add linkN onto the list of active links (if it is not already there).

When this algorithm terminates, we have constructed the Routing Tree.

Tracing Back the Optimum Route

To find the optimum route from the source link linkA to the destination link linkB using the Destination Tree, we need only use the TTBackIndex1 file. For example, suppose that linkA had ID 238,345. The link that linkA preceded along the optimum route is found at offset 238,345 in the file TTBackIndex1. Suppose this link had ID 1,432,876. The link this one preceded along the optimum route is found at offset 1,432,876 in the file TTBackIndex1. We keep repeating this until the link ID extracted from the file matches the linkID of the destination link linkB. Then we have extracted all of the link IDs of the optimum (shortest) path in forward order. This is a common way of extracting the shortest path once Dijkstra's algorithm has terminated.

Note that this path will be identical to the one extracted from the Source Routing Tree in the section above. It does not matter if Dijkstra's algorithm is run from the source node outwards or the destination node inwards, it will always find the single shortest path route from linkA to linkB. However, the Routing trees that are a by-product of Dijkstra's algorithm are very different. The only route that they share completely in common is the global shortest-path route.

This extraction also works to find the shortest path from any other link linkC in the graph to linkB, so long as we have allowed the Routing Algorithm to run until there were no more active nodes. If the routing algorithm was terminated early, then we can only use the tree to find the optimum route to a subset of the nodes in the graph.

Combining Routing Trees

Once we have computed the tree RTa from the source link linkA, and RTb to the destination link linkB, we also have a wealth of cost information.

For example, to find the cost of going from linkA to linkB along the global optimum route, we look at offset <linkA> in the TTMinCost1 file that contains the min-costs for the destination Routing Tree.

We can also look at offset <linkB> in the TTMinCost0 file that contains the min-costs for the source Routing Tree. This value will be the same.

Now, what if we are interested in some other link linkC. The cost at offset <linkC> in the file TTMinCost1 is the cost of the minimum cost route from linkC to the destination linkB. The cost at offset <linkC> in the file TTMinCost0 is the cost of the minimum cost route from the source link linkA to linkC. If we add these two quantities together, we have found the cost of the minimum cost route from linkA via linkC to linkB.

Thus, without any further iteration, we have found the cost of going from linkA via any other link linkC in the graph to linkB. We can also rapidly trace the optimum route for display or other purposes by using the back pointers contained in the files TTBackIndex0 and TTBackIndex1. This is a very powerful result, as we have effectively computed a whole set of alternative routes (as many as there are links in the graph to go via) along with their costs. Of course, these are only a tiny subset of all of the possible routes, as they are constrained to follow the globally optimal route from linkA to linkC, and the globally optimal route from linkC to linkB.

Plateaux

Now we observe that the routes are not unique. There will be some links, say linkP and linkQ, where going from linkA to linkB via linkP generates exactly the same route as going from linkA to linkB via linkQ. This happens when the route between linkP and linkQ in one Routing Tree (say the Source Routing Tree RTa) is identical to the route between linkP and linkQ in the other Routing tree (RTb). That is, the sections of road between linkP and linkQ have been used consecutively by both trees.

These are exactly the "good" chains of roads that we are interested in as part of diverse alternative routes. They are the chains that appear consecutively in both trees. We can attempt to find them by comparing the way that links are entered and left in each tree, or we can use the sum of the costs from RTa and RTb.

The chains are identified by the cost of going from linkA to linkB on mincost routes via any of the links in the chain being the same cost. For this reason, we call such a chain a plateau, as the sum of the costs is constant along the links that it is composed of.

The next two subsections give alternative methods for finding the links that are part of plateaux, which may have different advantages according to the properties of the cost function, and the memory and processor architecture on which the methods are implemented. It will also be apparent that these methods can be adapted to different graph representations, means of storing the flags, and properties of the cost functions.

Finding Plateau Links from Combined Costs

To find all of the plateaux, we scan through all of the linkIDs. For each one, we look at the links pointed to by the BackIndex in each tree (RTa and RTb), and see if the sum of costs is the same on both of them. If they are the same, then we flag this link as part of a plateau. The flags are stored, as usual, in a memory mapped file. It is called TCFlags01, and contains eight bits per link. It is initalised to have all bits set to 0 (flags unset) at the beginning of this procedure. We use the least significant bit (bit7) as the flag showing if the link with that offset has been identified as part of a plateau.

Here is the file definition for the flags, with the number of elements in the file given in square brackets after the file name, followed by the type of each element:

File Description:
TCFlags01[nLinks]: A series of INT8's used as flags when combining RTs denoted by 0 and 1.

Once this scan is complete, we have flagged all links that are part of a chain (using bit7), excluding the end two links.

This method only works if the cost values are integers, so that rounding errors do not spoil the equality that we are looking for. Further, it only works if the cost for traversing a link in the tree is always the same, no matter what order the tree was constructed in. This is true in general, but if, for example, the link costs are time-dependent and traversed at slightly different times in the two trees, then this method will not work, and an alternative method based on back pointers must be used instead.

Finding Plateau Links from Back Pointers

To find all of the plateaux, we scan through all of the linkIDs. For each value of linkID, say linkP, we see if that link has a back pointer in the Source Tree. All links except the source link will have a valid pointer. Suppose that it points to linkQ. We then mark linkQ as having a source pointer by setting a nominated bit (say bit5 in the TCFlags01 file) at the byte in the TCFlags01 file whose offset is the ID linkQ. We also see if linkP has a back pointer in the destination tree. If it does, say linkR, then we set a different bit (say bit4 in the TCFlags01 file) at the byte whose offset is the ID linkR. If we set either of the flags at bit4 and bit5, we look at the other, and if it is also set, then we know that this link is part of a plateau and we can also set the plateau bit (bit7) as in the costs method.

Once this scan is complete, we have again flagged all links that are part of a chain (using bit7), excluding the end two links.

Gathering the Plateau Links

We now need to find the chains themselves, and characterise them. We do this with another scan through all of the links.

For each link, we check to see if it has been flagged as part of a plateau (using bit7). If it has, we look at bit6 to see if it has already been processed. If it has not, then we mark it as processed (using bit6), and trace back in both the source and destination trees for as long as the links encountered are also marked as part of a plateau. We mark all such links as processed using bit 6 so that we will not process any links in this plateau if we encounter them again in later stages of the scan.

As we trace the plateau in this way, we could gather information about the plateau for later use, such as its length and the cost of traversing it, but in this particular implementation, we will only use costs as the basis for selecting the best plateau, which are already stored in the TTMinCost files, so we do not need to compute them again. Rather, we note the linkIDs of the ends of the plateau, linkIDps being the end of the plateau nearest the source, and linkIDpd being the end of the plateau nearest the destination. For each plateau that we have thus found, we extend one link closer to source and destination from the ends (if possible), and compute the difference in the mincosts for those links looked up from either RTa or from RTb (the results have to be identical as the plateau forms a connected part of each tree). This is what we take as the cost for traversing the plateau.

Goodness Criteria

Now, as we scan, we want in general to reject the shorter plateaux, and keep the longer ones. We also want to favour plateaux that form parts of routes that are not too long. If we are going from Cambridge to Manchester, we are probably not interested in a long plateau that is in Scotland, which can sometimes form from certain alignments of roads.

To select only the plateaux that are of greater interest, we compute a "goodness" value, which we arrange to have higher values for the plateaux that we are interested in. We will then keep a note of the end links of the plateaux with the highest n goodness values, where n is greater than the number that we could possibly want to display to the user, say 100. The goodness could be computed in any way, using any of the properties of routes such as length, financial cost, types of road, distance from source or destination.

In this implementation, we choose to base the goodness value on cost (as used to compute the mincost). We want a higher goodness for the plateaux that have a greater cost difference between their ends, as they represent longer parts of the Routing Trees that have been pulled into coincidence, and hence represent longer stretches of road that are locally useful in getting from linkA to linkB. However, we also want lower goodness values for plateaux that form routes from linkA to linkB that have higher overall costs.

Thus a simple goodness value is just the overall cost of traversing the plateau minus the cost of the route from linkA to linkB using the plateau. This is in general negative, and is in fact the negation of the cost of the route using the plateau that is not contained within the plateau itself. Thus, we are preferentially keeping the plateaux whose routes have the least cost contained outside of the plateau.

As we complete each scan of a plateau, we compute its goodness, and save the top n (typically 100) that we find in a sorted list. We know that we only have to save the details of a plateau if its goodness is greater than the plateau with the lowest goodness in the list, which we then replace.

Best Plateaux Selection

The goodness value that we have defined has now put the plateaux in the order in which we would want to show them to a user, but how many should we show?

To do this, we need to transform the goodness value into something that can rate the plateaux routes on a scale that is independent of the source and destination links, and of the costs and scale of the road graph. To do this, we first make the goodness dimensionless by dividing it by the cost of the globally minimum cost route (GMCost). Call this the raw goodness.

To review, raw goodness is the negative of the cost of the route involving the plateau that is not part of the plateau, divided by the cost of the globally mincost route (GMCost).

This raw goodness will have a value of zero for the globally minimum cost route, as there is zero cost outside the plateau.

Now consider any tiny deviation from the globally minimum cost route (which is itself a plateau for its whole length) can only involve a tiny plateau, as no two plateaux can ever contact each other. The cost that is outside the tiny deviation will be just slightly lower that the GMCost, so the raw goodness will be a negative number that is slightly greater than $-1$, e.g. $-0.994$, $-0.987$, $-0.992$ etc.

Now, what about a plateau whose traversal cost is roughly identical to GMCost. If it extends very close to the source and destination link, then it will have little cost outside of itself, and so the raw goodness will be just slightly more negative than 0, perhaps 0.027, 0.012, 0.023 etc. If it is far enough from the source and destination link that the costs outside of the plateau are comparable with the GMCost, then the raw goodness will be roughly $-1$. If it closer, such that the costs outside the plateau are half that of the GMCost, then it will have a raw goodness of $-0.5$.

To make these values easier to understand, we convert them monotonically to another range, where 0 (the best) maps to 99, $-0.5$ maps to 90, $-0.85$ maps to 50, and $-1$ maps to zero. This is only used for display to the user, where the values between about 20 and 99 span the range of poor to good routes.

The function used is: goodness=$100-(99^{-raw\_goodness})$

To select automatically the minimum set of diverse alternative routes that are worthy of consideration, we set the goodness cut-off point at 50 (or $-0.85$ in raw goodness), and via display or otherwise make the user aware of only these choices.

For Cambridge to Manchester, this selects just six routes (our test database pre-dates the M6 toll).

Success Criteria

To be considered a success, our method must only come up with routes that seem reasonable, nothing outlandish. We could put limits on the time or length of journeys to achieve this, but the goodness factor outlined above seems to make this extra step unnecessary, at least in this application.

The set of diverse alternative routes should include all those that we knew about as good routes from our own experiences, or at least minor variations on them (as the routing database does not perfectly reflect the user's view of costs, but is roughly correct over the longer stretches).

The set of diverse alternative routes should include each of the best single routes computed by other route planners such as (for Great Britain) Microsoft AutoRoute, ALK CoPilot, Medion Navigator, ISYS Personal Navigator.

We have found that the methods outlined above yield a set of diverse alternative routes that meet these criteria, whether the source and destination are many hundreds of miles apart, or just ten miles apart. If the source and destination are fairly close together (say 1 mile), then the routes cannot be very diverse, so only a few routes of almost identical length but good diversity might be suggested. If they are so close together that one would only ever conceive of one route, then only one route, the globally mincost, will be suggested. Of course, many others will have been generated by our method, but only one will have a goodness of greater than 50.

Plateau Algorithm Costs

The scans involved in finding, classifying and sorting the plateaux are in general at least one hundred times faster than running Dijkstra's algorithm or its variants, so this entire phase takes much less time than the finding of the single optimum route. Thus the overall cost of our method is approximately that of running a single route-finder twice, plus some fraction of that. As a rule of thumb then, it will take between 2 and 3 times longer than finding the single shortest path route, but we will have considered many thousands, and selected our best few for display to the user.

Use of Other Criteria

Our example implementation uses a cost function that is 100 times the time in seconds plus the length in metres. Thus if we could save 1 minute of a journey (60 seconds) by driving an extra 1 km, we would consider each route about even. This seems a good general setting to generate a good set of choices. It is weighting heavily towards the quickest route.

To favour shorter routes, we might 10 times the time in seconds plus the length in metres, which gives almost identical choices.

Ignoring time completely, by using pure distance as the cost function, does work, and we get a different set of choices. In most cases, all of the routes are quite a lot slower, but we still get a diverse set of choices of similar cost (distance in this case).

There is no reason why we should not include anything else in the cost function that might be used for a single-router. These include financial cost (petrol, wear-and-tear, road pricing, tolls), historical and real-time congestion information, safety, weather, type of road, areas to avoid, familiarity to the driver and many others. Some of these will change as the journey progresses, and we may wish to adapt to their new values.

For example, the phrase dynamic routing is used to describe systems where route choices are made according to the latest congestion information that is being fed to the vehicle. To use such information, we could update the delays on the links in the database that are affected by congestion or other factors, and re-run our method. This is what single-routers do when new information is made available.

We have another, more interesting approach available. Since we have a set of good diverse routes already computed, we can assess each one according to the new cost criteria in a fraction of the time that it would take to run a single router. We can then use these new cost criteria to re-order the routes for displaying to the user.

We can also check each of the diverse routes for cost and duration at different times of day, and provide the user with the optimum time to make their journey, or even the optimum days. If this were done by re-running a single-router for every ten minutes of every day of the week (1000 times), the time taken could be prohibitive (4000 seconds=66 minutes). Our method, of selecting the set of diverse routes first and then assessing them using the time-varying cost parameters, will run in a tiny fraction of the time, probably about 12 seconds on this scale. It is rather analogous to a person looking at a route planning map and selecting the likely routes to use based on road type (speed) and direction, then assessing them individually for their properties with the aid of a computer to do the hard work of adding up all the costs. This is far less work for the computer than if it had to assess the costs of all possible optimal routes to come up with the least cost.

There will be some types of dynamic information where a major recomputation will be necessary, and so we would see our system as an addition to existing techniques. For example, if new information came in during a journey that showed a large delay ahead, before any other diverse routes left the current route, then we would fall back on existing technology to compute a single route around the new obstruction. Of course, once this was done, we could continue and compute the diverse routes from where we currently are to the destination, and offer a choice where appropriate.

An important feature of this choice routing is the information that it gives to the user. In many cases where a single-router is run, the user does not understand how the optimum route compares to one that they might have chosen. Indeed, in most cases, both routes will have very similar costs. If we show the user the relative times and distances, then they can make the choice to use the route that they prefer, or follow the newly recommended route. What we will have avoided is the uncertainty that the user might have done something wrong, such as picked the wrong destination, set the wrong preferences etc.

If the optimum route suggested has been made because of unusual congestion, then this can be made apparent to the user at the (very few) choice points by showing them both options, the original best route, and the one that is recommended today, with the journey time information for each. Indeed, we may even highlight if the journey time is significantly different from the usual.

For example, suppose a route involving the M6 is subject to an extra 20 minutes delay. This may now make a route up the M1 some five minutes faster. A single router would automatically guide the user up the M1 route, whereas our method would allow them to make an informed choice to stay on the M6 (that they may prefer for other reasons) and sacrifice the five minutes.

This information could be given in the common forms of voice prompts, or schematic junction displays (just like road signs). The difference with our system, is that at critical parts of the journey, the guidance does not just give the single route to be followed, but gives two or more options (very rarely more than two) with some information about their relative journey times. Examples of this are shown in FIG. 15.

Performance

In order to speed up the routing computations, we can save the Routing Trees both to and from recently selected links in the graph. This is an extension of saving recently entered locations for easy recall, sometimes called a "favourites" list. If one end of a route is on the list, then we do not have to compute either of its Routing Trees. The best single route to or from any other node can be found immediately by a back-trace through the tree. If both ends of a route are on the list, then we can recall both Routing Trees that are necessary for our Choice Routing, and no longer need to run Dijkstra's algorithm. Thus we can come up with the diverse alternative routes quicker than a conventional router could compute the single best route.

The trees can be saved by keeping the files in which their costs and back pointers have been computed, or if an alternative implementation has been used, then new file formats could be defined for the storage of this information. If storage is at a premium, then strictly only one of either the back pointers or the costs need to be stored, as a scan through the routing database can be used to reconstruct the other without the need to run a full routing algorithm again.

Time Dependent Routing

Where the speeds of the links may vary with the time of day, where road pricing changes with time, or where real-time traffic information is available, a conventional router will run something similar to Dijkstra's algorithm to find the best route, where the link costs have been altered to reflect the latest time-dependent information, and where they are sensitive to the time that the links are expected to be traversed.

Our technique could be used in just the same way, running Dijkstra's algorithm twice with the latest cost information. The choice routes that take much longer than the globally optimal route might be using time-dependent information for slightly earlier or later times than their expected time of traversal, because there is no longer a unique journey time from Source to Destination, but rather a small range of journey times.

This is unlikely to be a problem as there is some inherent variability in journey times and predicted traffic levels anyway.

To remove this uncertainty in the expected time of traversal, we can take the few best generated routes, and quickly reassess them individually against the time-varying cost parameters, getting the most accurate result possible.

This then suggests a further technique. Instead of using the time-dependent cost parameters in the first routing runs, we could use a basic cost function, such as time (congestion-free) and distance alone. Once we have found the few choice routes using this basic cost function, we re-assess each of them against the new time-varying criteria, and simply re-order them for presentation to the user. In this way, we can be quicker to react to changes, we can make clear to the user why one route has been chosen rather than another, and we can additionally show the user the choices that are almost as good as the best route.

If the cost function has changed radically due to the time varying or other cost parameters, then the choice routes computed under the restricted cost function may no longer include the globally optimum route under the full cost criteria. In this case, we can run our choice routing algorithm in both modes, a restricted cost function and the full cost function. We can then choose to display to the user the best routes from each, so that they see both the very best routes currently available, and how they compare with the ones that they might have chosen based on time and distance alone.

The use of the full time-dependent cost function could be counter-productive in some circumstances. Under severe congestion, the time-dependent optimal routes are likely to involve more minor roads, along which there are no traffic sensors or reports. These roads appear to be free-flowing, where in reality they may be clogged, so the chosen routes may not be optimum after all. Thus we would always recommend that at least some of the choice routes computed without the time-dependent information, but reassessed with the time-dependent information, should be displayed so that the user can choose to stay on the major routes if they so wish. This could also be the safer option in the case of severe weather where the emergency services will be attempting to keep the major routes moving, and will be attending breakdowns.

Other Cost Factors

The RTs using the basic cost function do not have to be re-computed when the other cost factors are varied. When we re-assess each of the diverse alternative routes, we can use new weightings in the cost function, and new cost factors on the road links, to give us a new ordering of the routes for presentation to the user. Indeed, a good desktop interface should allow the user to sort the alternative routes by time, distance, financial cost, type of road, number of turns etc. as they explore their options. This does not necessarily require any recomputations, as those factors can be computed and stored along with the alternative routes when they are first generated.

It is not yet known whether it will be possible to define a useful cost function when road user charging becomes more commonplace. The problem is that the tradeoff between speed of journey and cost may vary according to the importance of punctuality at the destination, which varies from day to day in an unpredictable manner. It may also be the case that the tradeoff varies according to how late the driver is setting off on their journey. If they are early, they may not wish to pay the charges for a faster route, but if they are running late, then charges may be more acceptable.

Our techniques of computing the Choice Routes using only basic cost parameters (time and distance), would allow us to show the driver a choice of sensible routes along with their estimated durations and costs, allowing the driver to make the decision for themselves taking into account all of the extra information that the route planner might never know. This is sometimes called "putting the human in the loop" and can make the resulting system much simpler and more comfortable to use, as the users are making the complex tradeoffs for themselves, while the computer is doing the hard work of estimating the journey times, distances, costs etc.

Traffic Planning

The Choice Routes do not have to be used singly. If we have journey information in the form of Origins and Destinations of journeys, we can use the choice routes to allocate traffic to all of the links used in those routes in proportion to the goodness of the routes. When calibrated against real data by the adjustment of the parameters used in the goodness computation, the use of a Choice Routing algorithm at the heart of such tools may give a more accurate prediction of traffic patterns than with current tools based on flow or single-route algorithms.

Methods of this type may also be applied to the routing of wires, conductors or cables, for example in buildings, aircraft, printed circuit boards and integrated circuits. When finding a route for a wire, there are a few differences from the case for road routes, particularly the routing of wiring nets, and the additional variable of placement order.

Wiring Nets

There may be several points from which a wire can originate, and several endpoints, any one of which is a sufficient destination. More complex are signal nets, where a wire is required to connect at least one point from each of several sets of points. We will call all of these points origins, as there is no direction of flow as there is with traffic, so there is no clear concept of origin or destination. Similar techniques to Dijkstra's algorithm are often used, perhaps starting from several origin points simultaneously, and keeping the usual values of minimum cost and back pointer at each node that is traversed, terminating and tracing back the optimum routes when all of the origin points have been joined. There are many variations of these techniques, but so long as they have the underlying architecture of a minimum cost and a back pointer at each node, we can apply our technique to add together separate routing trees from each origin node, find the chains of identical cost-sum (the plateaux), and generate several alternative Choice Routes (or signal nets) by tracing them back to the origins.

Placement Order

Another important difference between road routing and wiring routing is that for wiring, we are not usually interested in optimising the path of a single wire, but of a whole collection. This brings in the problem of the order in which we should try to route the individual wires. Again, there are many variations, but a common technique is to find routes and fix the positions of some of the wires (called placing those wires), and then if a further wire has problems such as congested paths, we take up some wires that have been placed, adding them to the list of unrouted wires, route the new wire, and then continue. This technique of rip-up and re-route is very expensive computationally, and may still terminate with quite poor routes. Various known enhancements try to estimate which signal wires are going to be the most difficult to place by looking at their lengths or the width of routing channels along their rough path, or can observe areas of congestion as they arise, and try to avoid clogging them up further by weighting the cost function against them.

Choice Routing for Placement Order

Our technique of Choice Routing can provide an important factor for choosing the order in which wires are placed. By computing the choice routes for each wire before any are placed, we can see which have only one good route available (like Cambridge to Canterbury in the roads case), and which have several good routes (like Cambridge to Manchester). It then makes sense to place the wires with fewer choice routes first, because if they block some of the routes for later wires, those later wires will have other good alternatives available. Further, our goodness value can be used so that we are not only taking into account how many good routes are available, but also how good they each are. A typical implementation will, for each wiring net, add up the goodness values of the top ten routes that are above a threshold (say a minimum goodness of 20), and then route the wires with the lowest sum first. Of course, this technique does not replace the known techniques, as we may still have to rip-up and re-route some nets, but we will sort the unplaced nets by the amount of choice available, always placing those with the least choice first, which should speed up the time to find a solution, and more importantly, will improve the final result by keeping the wiring nets shorter overall, or not requiring such wide routing channels.

Figure 17:
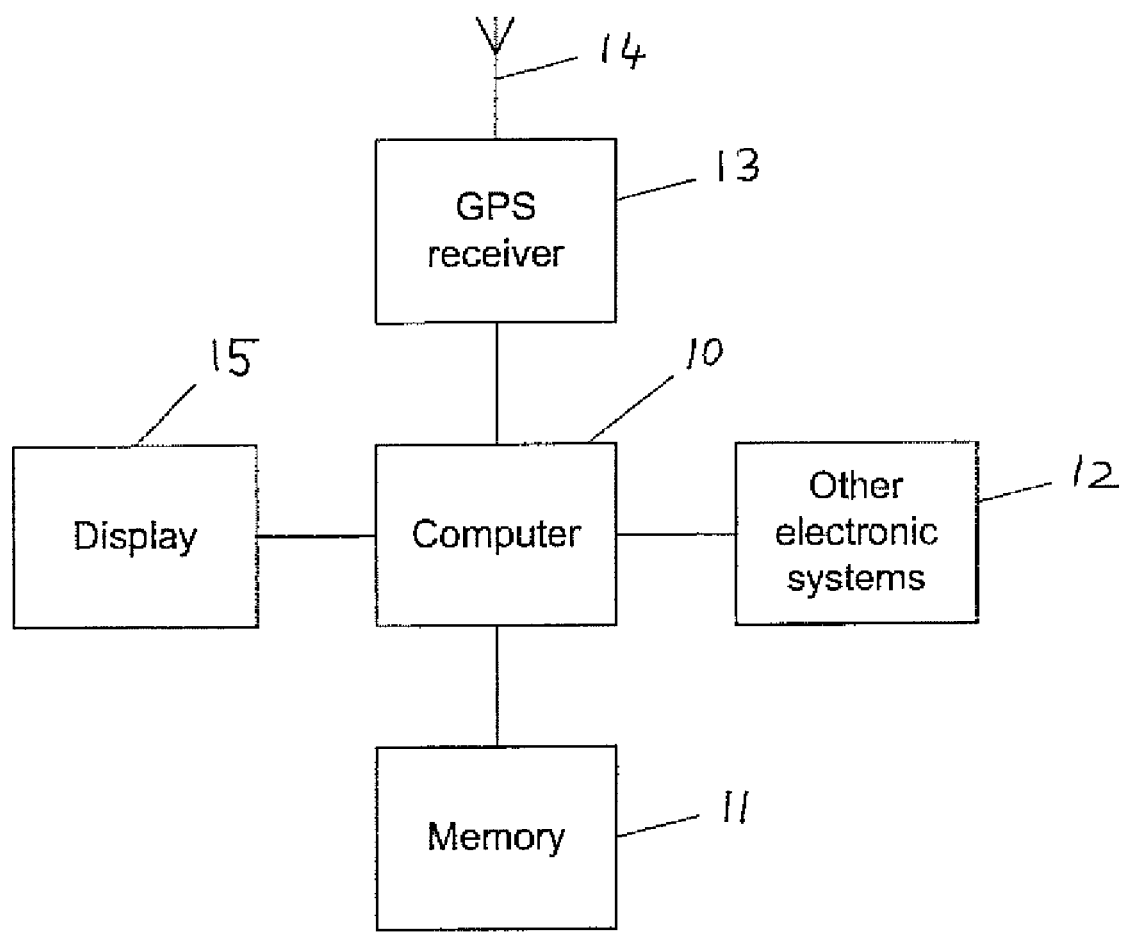
FIG. 17 is a block schematic diagram of an apparatus constituting an embodiment of the invention.

FIG. 17 shows an example of a navigation apparatus in the form of a computer 10 with a program memory 11, such as a ROM, flash memory, a hard disk drive and/or an optical disk drive, installed in a vehicle such as an automobile. However, such an apparatus is not limited to use in vehicles and may be attached to or installed in other objects. For example, such an apparatus may be installed in a cellular or mobile telephone, for example of the type which receives information about its geographical location and about the current time.

The vehicle comprises vehicle electronics 12, which monitor and control many of the systems on board the vehicle. The computer 10 is thus able to receive information about various aspects of the current state of the vehicle.

The vehicle is further provided with a GPS receiver 13 for determining the location of the vehicle and the current time from signals received from the GPS via an aerial 14. This information is also supplied to the vehicle electronics 12, for example so as to provide the function of a satellite navigation or "Sat Nav" system.

The computer 10 is also provided with an output device 15 for providing a human-perceivable output. The output device 15 is illustrated in the form of a display, for example forming part of the Sat Nav system or of an in-vehicle entertainment system, but may alternatively or additionally comprise an audio output device such as a loudspeaker.

Although the computer 10, the program memory 11 and the receiver 13 are shown as separate items in FIG. 17, they may be embodied by a single apparatus which may also include the display 15.

Restricted Search Using Road Types

Figure 18:
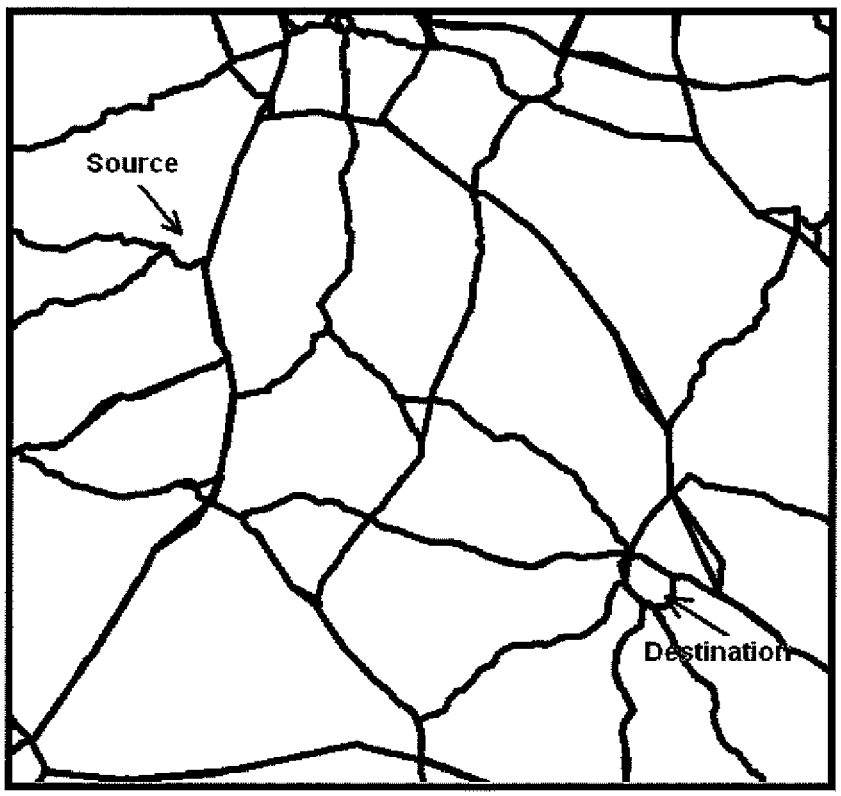
FIG. 18 illustrates priority roads in a small hypothetical road network.

A common means of making route computations faster is to restrict the search to a subset of roads that are generally faster or more useful when sufficiently far from the origin or destination of the journey. We will call them priority roads and the subset is arranged to also include junctions, slip roads etc. to ensure that they are fully connected. A set of such roads is shown in FIG. 18. The techniques of choice routing, where the source and destination trees are combined to find chains of road links that are traversed in the same direction in each tree, will still work successfully with such restricted trees. However, in the case of Choice Routing, it is not necessary to cover the slower local roads at both origin and destination in both trees.

Figure 19:
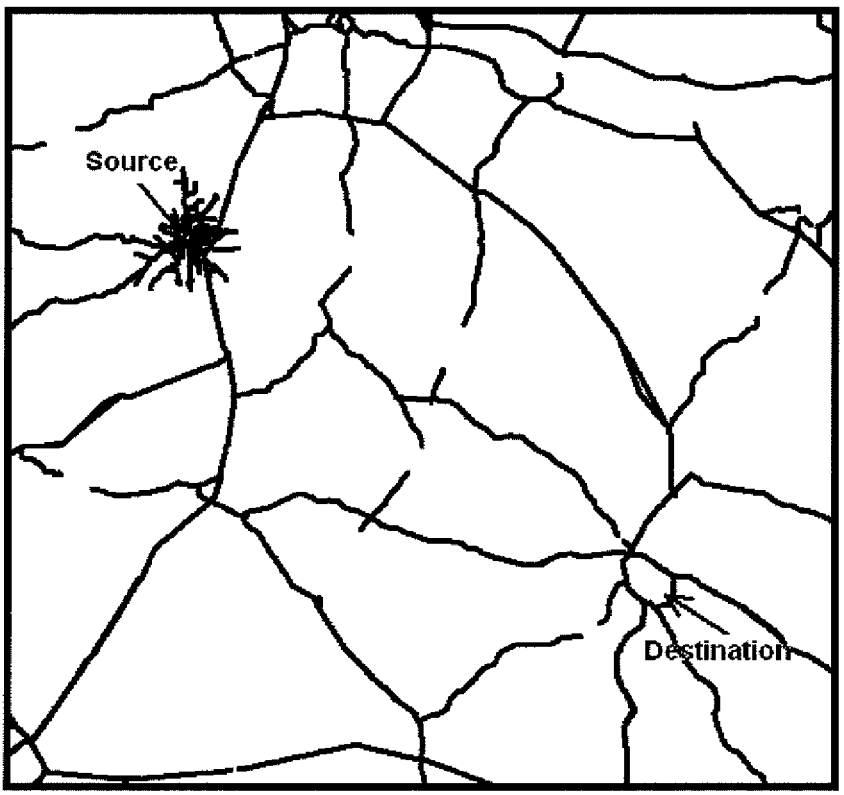
FIG. 19 illustrates a source routing tree generated by a modified method constituting an embodiment of the invention.

For the source tree, as we search outwards from the source, we can use all road types until some limits are reached and then switch to only considering faster roads. An example source tree is shown in FIG. 19. The limits are best determined by noting the costs at which the faster roads are first encountered and then allowing an extra cost (in time and distance) and perhaps a percentage overrun. For example, using time only, we might use an overrun of 20% plus ten minutes. If we encounter the first fast road at thirteen minutes from the origin, we would then allow the local roads to be used until the minimum cost surface had reached (13*1.2)+10=25.6 minutes. If we used a more graded road classification, we could have several thresholds such as local to urban to interurban to trunk road searches.

For the source tree, as it approaches the destination, a conventional use of the road types would detect that we were getting close (say within 30 minutes as the crow flies at 50 mph, which is 25 miles) and use this to switch to searching the slower road types again. There is an additional problem here as none of the priority roads may come within 25 miles of the destination. Thus we might never switch back to local routing and we would miss the destination entirely. To guard against this, some more sophisticated scheme could be used to switch back to local routing at some larger range.

This is what is conventionally done and then choice routing could combine the source and destination trees in the usual way.

Figure 20:
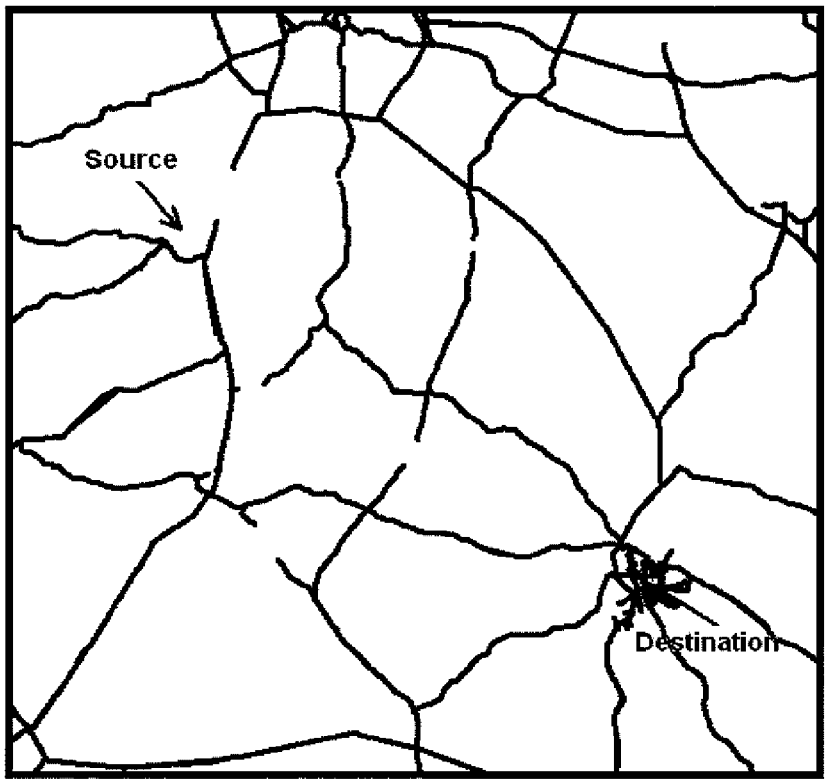
FIG. 20 illustrates a destination routing tree generated by the modified method.
Figure 21:
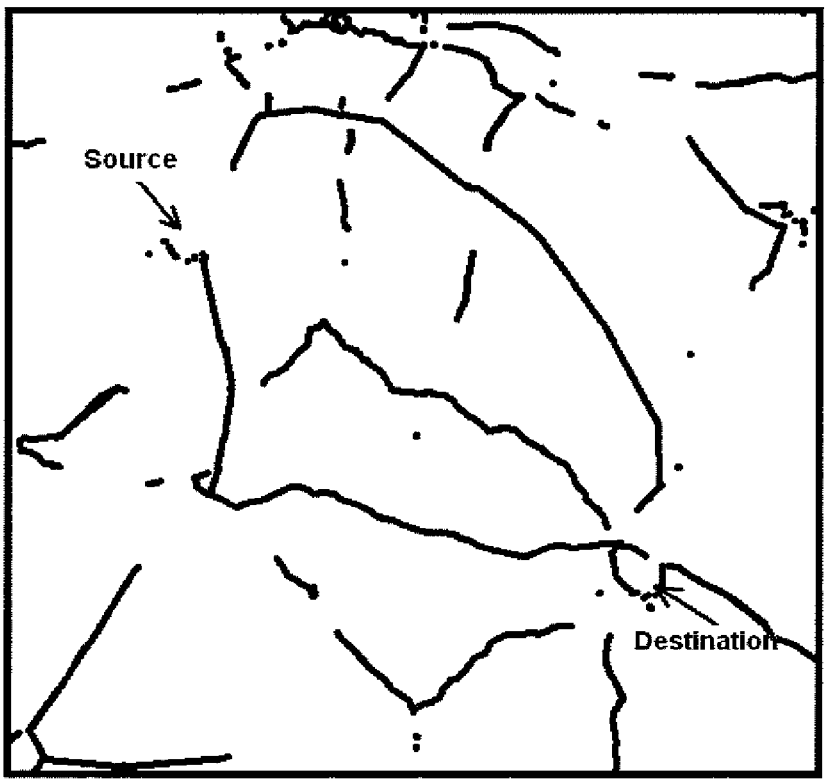
FIG. 21 illustrates the sub-routes or plateaux derived from combining the trees of FIGS. 19 and 20.
Figure 22:
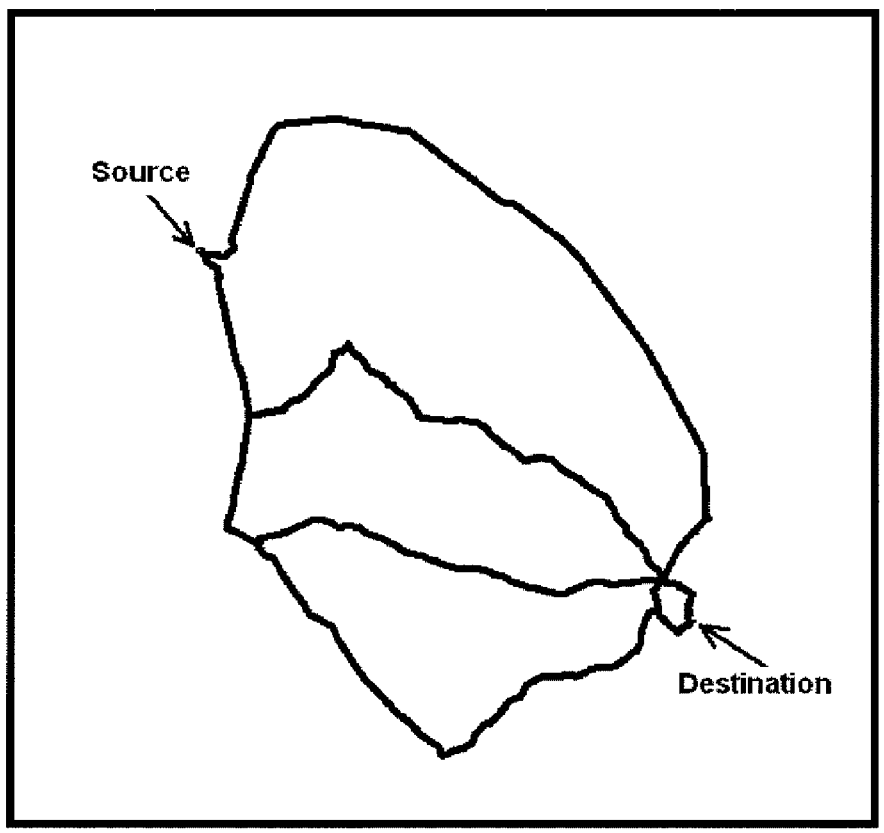
FIG. 22 illustrates the diverse routes derived from the sub-routes of FIG. 21.

However, in choice routing, we have a better option. We do not require the source tree to reach the destination or to explore local roads in its vicinity as that would only be a small part of the plateaux. Thus, we have a source tree that explores all the local roads in the vicinity of the source but ever fewer road types as we move away from the source, perhaps missing the destination if it does not lie on one of the faster road types. Now we compute the destination tree in a similar fashion, this time exploring all the local roads in the vicinity of the destination and ever fewer road types as we move away from the destination, perhaps missing the source if it does not lie on one of the faster road types. An example is shown in FIG. 20. Next, we combine these trees in our usual way. For the good fast roads aligned usefully between source and destination, we will find that they are in both trees and traversed in the same direction, so the plateaux will form as usual. An example is shown in FIG. 21. One difference is that no plateau will necessarily reach all the way from source to destination but the longest will stop short at each end because the local roads were not explored in both trees. This is not a problem though, as we first find the longest plateaux and we generate the optimal routes from them in the usual way, tracing back to the source using the source tree (which will use the local roads in the vicinity of the source) and tracing back to the destination in the destination tree (which will use the local roads in the vicinity of the destination), so we still obtain complete routes using local roads at each end. An example is shown in FIG. 22.

This method has two advantages over trying to compute a source or destination tree with slower roads used at both source and destination. Firstly, we reduce the computation overheads from two slow road type searches in each tree to just one for each tree, so choice routing becomes more efficient and closer to the costs of just running a conventional router. Secondly, the decision on when to switch from slow roads to a faster road type is much easier when moving away from the origin in the source tree, or away from the destination in the destination tree. This is because we can notice how many roads of the higher types we have encountered and use that as part of the switching criteria. This can easily be done several times for a hierarchy of faster road types. A conventional router would have higher overheads when moving towards the destination in the source tree, because of the occasional difficult case where slower road types must be used for the last 30 miles, but which is not known in advance. Thus, the conventional router would switch at this worst case distance all of the time. For the common cases though, where slower road types might only be necessary for the last 5 miles, switching to slower road types at 30 miles distance is very wasteful.

Time Dependency in Throughroute Trees

If we have time dependent information, such as the average road speeds for each five minute period of each day, we can still compute our source and destination trees and combine them in the usual way. For example, if we are given an arrival time, that is, a time of day to arrive at the destination, we would first compute the destination tree, estimating and storing the time of day at which we would traverse each road link in just the same way that we estimate the cost function, and computing the time taken and cost to traverse each link using the average speed for that time of day. Once the destination tree had reached the source, we would have an estimate of the necessary departure time from the source. We could then use this departure time to construct the source tree, again using the estimated time of day at which each link is encountered to obtain the average speed for that time of day and so take into account the variation in traffic speeds. We can then combine these trees in our usual way, to obtain the plateaux, and grade then according to our goodness function. This will work adequately, but could be better. The problem is that a particular sequence of road segments that is not on the globally optimal route may have a time estimate for their traversal which is at a slightly different time in the source tree than it is in the destination tree. This may cause minor variations in the route taken, which could break the resulting plateau into two and downgrade it in the goodness criterion, all because of a minor variation which is irrelevant to the overall journey.

To avoid these minor variations, we fix the estimated time of traversal from the first tree that we compute. That is, for each road link, we not only store the cost at which we have reached it, but also the estimated time at which we traverse it. We then use those times when we compute the next tree, rather than compute them afresh. In this way, the time dependent costs of traversing each link will be identical in both trees and there will not be any minor variations in the routes taken, so the long plateaux will not be broken by small irrelevant differences between the trees.

A slight variation on this implementation would be to store the cost of traversal of each link in the first tree, rather than the time of traversal. Then these costs would be used in the computation of the second tree, rather than computing them afresh. This technique could be used with any cost function which might vary between the two trees, whether because of differences in time of traversal, or route followed so far, or for any other reasons.

Guidance after Choice Points

Once the choice routes are known, we can assess each for a range of different criteria that we may or may not want to include in the original cost function. For example, we may not want the roads used to change because of the weather but we may be very interested in how the different choices compare, especially if one route is predicted to be dry while another may be wet. Without further route computation, we can compute and display these other criteria for each choice route and display the routes in an order according to them, such as best weather first, or lowest carbon emissions, or good spread of stopping places.

Once the choice routes are known, we can also compute the junctions at which one or more choices diverge. As described hereinbefore, we can present these choices along with information about their properties to the driver well in advance of the junction so that the driver can simply choose which way they want to go and drive along it.

If the driver has requested route guidance, how should that work at the choice point? Presentation of the choices as a road sign is a good substitute for the usual junction diagram with one exit highlighted, and the audio guidance could similarly offer two or more options as this is being done well in advance of the junction.

The driver could now choose a route that they wished to be guided on by selecting one of the routes, by some conventional interface such as a button, touchscreen, or by voice command. However, we can offer a new method. Because we know that the junction is a place where choices are to be made, we can interpret the driver's behaviour there as a positive choice between routes. If the vehicle moves away from the junction on one of the choice routes, we interpret that as a selection by the driver. But how do we now perform guidance? We can simply use the choice route itself and, at each further junction, guide the driver to the next road segment on that route. But what happens if the driver deviates from that route?

A conventional guidance system would recompute the optimal route from the current position to the destination and resume guidance along that. Our problem is that this new optimal route may not be the chosen choice route, so the driver would find themselves not being guided along the way that they had chosen. Once the driver was far enough along the chosen route that they were on the plateau, then we know that the optimal route to the destination is indeed the choice route itself but, until the route reaches the plateau section, there will in general be a more optimal route that does not use the plateau. This then gives us one possible solution.

After the driver leaves the junction, we switch guidance to a point that is on the plateau for the chosen route and only once that point has been passed do we resume guidance to the destination. We could use any point on the plateau, such as the beginning, middle or end, but, to allow this intermediate guidance point to be dropped as soon as possible, we recommend that the first road segment reached on the plateau is used. When the driver passes that point, we switch guidance back to the destination as that will now be along the choice route anyway. There is also the possibility that there is another choice point before the first plateau is reached. In that case, we simply make the next choice point the temporary destination for the guidance and, again, switch guidance back to the destination once that point is passed.

There is still the possibility that the driver does not pass through the intermediate guidance point, which is a problem faced by conventional systems where waypoints or vias can be added to a journey, so any of the conventional solutions can be used. For example, if the driver strays from the route that we are guiding them along and the newly computed optimal route to the via becomes one that moves away from the final destination for some distance (or cost), as known from the destination tree, then we can cancel the guidance to the via as if it had been reached and continue guidance from the next choice point after that via or the beginning of the plateau on the route with the highest goodness, whichever would have been reached first.

With these techniques, we can now allow the driver to make their choice between the routes that we have presented just by driving along one or another of them and yet we can still offer guidance if required, even if they stray off the guided route.

Fast Diversionary Search

Once the source tree and destination tree have been combined, we have computed the cost (or time, or distance) of going from source to destination via any node in the combined tree. This can be useful in itself for finding routes that involve particular places of interest as the route via any node can be traced back in the two trees without having to run a routing algorithm again.

This can be particularly important if we wish to consider the cost of going via any of a large number of nodes. An example of this is where we want to look for good stopping places on a journey. For a chosen route, we can find all points of interest (perhaps restaurants, toilet facilities, petrol stations, rest areas) that lie within some distance from it as the crow flies. We call this a proximity search and there are well-known techniques for doing this. One technique is to compute the perpendicular distance to each link on the route to find the minimum perpendicular distance, and another is to compute the straight-line distance to each junction on the route to find a lower bound on the driving distance. Typically, we might find all restaurants within a 5 km band on either side of the route, or all petrol stations within a 1 km circle of any junction on the route. Now, although the restaurants or petrol stations are close as the crow flies, they could involve a large amount of extra driving (perhaps 10 km out and back from the next motorway junction), or they could involve very little extra driving (leaving at one junction and travelling in parallel to the next).

The extra driving time and distance do not require a new route computation to find them. If we look at the combined tree, we already have the cost of going from source to destination via the link that the restaurant lies on. Thus we have the time and distance of the optimal route from source to destination via that link. This will, in general, be higher than the via cost of the nearby choice route, which is available as the cost of going via any link on the plateau for that route, and will, in general, be a minor diversion off that choice route. More importantly, it will in many cases be the minimal diversion from the choice route to go via that restaurant, whether that is by going out and back on the same road, or going out on one and back on another.

Thus we can filter the restaurants found by the proximity search and keep only those that add less than some threshold amount to our overall journey cost. Of course, we do not need to use the same cost function that was used to construct the trees. The trees can also contain the cumulative time, distance, safety or other factors, in addition to the cost function that they are minimising, and then these can be used in the thresholding. For example, we may find all those restaurants that do not add more than ten minutes to our estimated driving time. To do this without using the combined tree would involve running a routing algorithm twice for each node found by the proximity search, which would complicate the code, take an uncomfortably long time, and consume precious CPU and memory resources. Instead, we simply have to look up the combined costs, time or distance that have already been stored in the source and destination trees, and summed in the combined tree. For those that we still consider viable, we can trace back the route from their nearest link in the source and destination trees to obtain the diversionary route without having to run an expensive routing algorithm. These routes can then be assessed for their road types, congestion, weather or whatever else the driver might consider important.

The invention claimed is:

1. A method of generating a plurality of diverse routes from a source to a destination in a weighted directed graph, comprising the steps of:
   generating a source routing tree from the source to a first set of points of the graph;
   generating a destination routing tree from a second set of points of the graph to the destination; and
   combining the source and destination trees to form the routes;
   wherein the combining step comprises selecting each sub-route common to and traversed in the same direction by the source and destination trees.

2. The method of claim 1, wherein the first set comprises all of the points of the graph.

3. The method of claim 1, wherein the second set comprises all of the points of the graph.

4. The method of claim 1, wherein the first and second sets comprise points of the graph adjacent both the source and the destination.

5. The method of claim 1, wherein the first and second sets comprise the same points.

6. The method of claim 1, wherein the graph comprises a first set of links, each of which has a first priority of use, and a second set of links, each of which has a second priority of use greater than the first priority.

7. A method of generating a plurality of diverse routes from a source to a destination in a weighted directed graph, comprising the steps of:
   generating a source routing tree from the source to a first set of points of the graph;
   generating a destination routing tree from a second set of points of the graph to the destination; and
   combining the source and destination trees to form the routes;
   wherein the graph comprises a first set of links, each of which has a first priority of use, and a second set of links, each of which has a second priority of use greater than the first priority, and wherein the first set of points comprises points interconnected by the links of the first or second set in a first region of the graph containing the source and points interconnected by the links of the second set but not of the first set in a second region of the graph outside the first region.

8. A method of generating a plurality of diverse routes from a source to a destination in a weighted directed graph, comprising the steps of:
   generating a source routing tree from the source to a first set of points of the graph;
   generating a destination routing tree from a second set of points of the graph to the destination; and
   combining the source and destination trees to form the routes;
   wherein the graph comprises a first set of links, each of which has a first priority of use, and a second set of links, each of which has a second priority of use greater than the first priority, and wherein the second set of points comprises points interconnected by the links of the first or second set in a third region of the graph containing the destination and points interconnected by the links of the second set but not of the first set in a fourth region of the graph outside the third region.

9. The method of claim 1, wherein the source and destination trees are minimum cost trees.

10. The method of claim 1, wherein the source and destination trees include back-pointers and the sub-routes are selected by finding sequences of adjacent points which are pointed to by back-pointers of both the source and destination trees.

11. The method of claim 1, wherein the points of the source and destination trees are associated with costs and the sub-routes are selected by finding sequences of adjacent points for which the sums of the costs from the source and destination trees are the same.

12. The method of claim 1, wherein the combining step further comprises extending each sub-route as necessary to the source and destination along the source and destination trees to form one of the routes.

13. The method of claim 1, wherein the points of the source and destination trees are associated with costs and the sub-routes are selected by finding sequences of adjacent points for which the sums of the costs from the source and destination trees are the same, wherein the combining step further comprises extending each sub-route as necessary to the source and destination along the source and destination trees to form one of the routes, and further comprising selecting at least one via point which is not on any sub-route or extended sub-route, calculating from the source and destination trees a minimum cost route from the source via the at least one via point to the destination, and comparing the calculated cost with the same sum of the costs for at least one of the selected sub-routes.

14. The method of claim 13, further comprising forming the difference between the calculated cost and the same sum for the selected sub-route.

15. The method of claim 14, further comprising deselecting the via point for which the difference between the calculated cost and the same sum is greater than a threshold.

16. The method of claim 1, further comprising assigning a goodness value to each route.

17. A method of generating a plurality of diverse routes from a source to a destination in a weighted directed graph, comprising the steps of:
generating a source routing tree from the source to a first set of points of the graph;
generating a destination routing tree from a second set of points of the graph to the destination; and
combining the source and destination trees to form the routes; and
assigning a goodness value to each route,
wherein the combining step comprises selecting each sub-route common to and traversed in the same direction by the source and destination trees, wherein the combining step further comprises extending each sub-route as necessary to the source and destination along the source and destination trees to form one of the routes, and wherein the measure is a function of the length of the sub-route and the length of the route.

18. The method of claim 17, wherein the measure is a function of the difference between the length of the sub-route and the length of the route.

19. The method of claim 16, further comprising selecting only some of the routes in accordance with the goodness values.

20. The method of claim 19, further comprising selecting the N routes of highest goodness value, where N is a positive integer.

21. The method of claim 19, further comprising selecting at least some of the routes whose goodness values are greater than a threshold.

22. The method of claim 1, further comprising storing at least one of the routing trees.

23. The method of claim 1, wherein the graph comprises links associated with costs.

24. The method of claim 23, wherein the cost of traversing each of the at least some links varies with a parameter of traversal.

25. The method of claim 24, wherein the cost of traversing each of the at least some links varies with the time of traversal.

26. The method of claim 24, wherein the first of the generating steps to be performed includes calculating and storing the costs of the links for the prevailing transversal parameter values and the stored costs are used during the second of the generating steps to be performed.

27. The method of claim 26, wherein the destination tree generating step is performed before the source tree generating step.

28. The method of claim 1, wherein the routes are ordered in accordance with at least one property of each route.

29. The method of claim 28, further comprising assigning a goodness value to each route, wherein the property is the goodness value.

30. The method of claim 1, wherein the graph represents a road network and the routes are road routes.

31. The method of claim 1, wherein the graph represents an integrated circuit or a printed circuit and the routes are interconnections.

32. The method of claim 1, wherein the graph represents a wiring installation and the routes are wiring interconnections.

33. The method of claim 31, further comprising:
assigning a goodness value to each route;
selecting only some of the routes in accordance with the goodness values; and
choosing the order of placement of the interconnections in accordance with at least one of the number of selected routes and the goodness values.

34. The method of claim 33, wherein the interconnections with the lowest numbers of selected routes are placed first.

35. The method of claim 1, wherein the graph represents a communication network and the routes are communication paths.

36. The method of claim 35, wherein the network is an internet.

37. A method of navigation, including generating road routes by a method as claimed in claim 31.

38. The method of claim 37, further comprising presenting information about the road routes to a user.

39. The method of claim 38, further comprising presenting information about a choice of routes from a point from which a plurality of routes diverge when the user approaches the point.

40. The method of claim 39, wherein the information is displayed in a form representing a road sign.

41. The method of claim 37, further comprising offering guidance to a user along a selected one of the routes.

42. The method of claim 41, wherein the combining step comprises selecting each sub-route common to and traversed in the same direction by the source and destination trees, wherein the combining step further comprises extending each sub-route as necessary to the source and destination along the source and destination trees to form one of the routes, and further comprising offering guidance, when the user leaves the selected route, to the sub-route of the selected route.

43. A non-transitory computer-readable medium carrying a program that when executed by a computer cause the computer to perform a method as claimed in claim 1.

44. A computer programmed to perform a method as claimed in claim 1.

45. A computer containing a program for performing a method as claimed in claim 1.

46. An apparatus arranged to perform a method as claimed in claim 1.

* * * * *

UNITED STATES PATENT AND TRADEMARK OFFICE
CERTIFICATE OF CORRECTION

| | | |
|---|---|---|
| PATENT NO. | : 8,249,810 B2 | Page 1 of 1 |
| APPLICATION NO. | : 12/445238 | |
| DATED | : August 21, 2012 | |
| INVENTOR(S) | : Jones | |

It is certified that error appears in the above-identified patent and that said Letters Patent is hereby corrected as shown below:

In the Claims:

Column 34, Claim 37, Line 28, please delete "31" and insert --30-- therefor.

Signed and Sealed this
Eighth Day of January, 2013

David J. Kappos
*Director of the United States Patent and Trademark Office*